United States Patent
Ichieda

(10) Patent No.: US 8,907,933 B2
(45) Date of Patent: Dec. 9, 2014

(54) DISPLAY SYSTEM, IMAGE OUTPUT APPARATUS, CONTROL METHOD, AND RECORDING MEDIUM

(75) Inventor: Hiroyuki Ichieda, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 363 days.

(21) Appl. No.: 12/967,463

(22) Filed: Dec. 14, 2010

(65) Prior Publication Data

US 2011/0141070 A1    Jun. 16, 2011

(30) Foreign Application Priority Data

Dec. 15, 2009  (JP) ................................. 2009-283738

(51) Int. Cl.
*G09G 5/00* (2006.01)
*H04N 1/00* (2006.01)

(52) U.S. Cl.
CPC ............ *G09G 5/003* (2013.01); *G09G 2320/08* (2013.01); *G09G 2370/04* (2013.01); *H04N 1/00376* (2013.01); *H04N 1/0044* (2013.01)
USPC .......................................... 345/204; 345/213

(58) Field of Classification Search
USPC .......................................... 345/204, 211–214
See application file for complete search history.

(56) References Cited

U.S. PATENT DOCUMENTS

| | | | |
|---|---|---|---|
| 6,683,585 B1 | 1/2004 | Nakano | |
| 7,170,534 B2* | 1/2007 | Son et al. ...................... | 345/659 |
| 2009/0204927 A1 | 8/2009 | Terasaki | |

FOREIGN PATENT DOCUMENTS

| | | |
|---|---|---|
| JP | 09-200710 A | 7/1997 |
| JP | 2001-034245 A | 2/2001 |
| JP | A-2004-070023 | 3/2004 |
| JP | A-2009-92999 | 4/2009 |
| JP | A-2009-187454 | 8/2009 |

* cited by examiner

*Primary Examiner* — Jimmy H Nguyen
(74) *Attorney, Agent, or Firm* — Oliff PLC

(57) ABSTRACT

A display system includes: an image output apparatus and an image display apparatus, wherein the image output apparatus has: a display image generating unit which generates a display image which is an image which the image display apparatus is caused to display; a control image generating unit which generates a control image which is an image including control information for controlling the image display apparatus; and an image output unit which outputs the display image and control image to the image display apparatus, and the image display apparatus has: a display unit which displays the input display image; a control information acquisition unit which acquires the control information included in the input control image; and a drive control unit which, based on the acquired control information, controls a drive of the image display apparatus.

18 Claims, 16 Drawing Sheets

DISPLAY SYSTEM, IMAGE OUTPUT APPARATUS, CONTROL METHOD, AND RECORDING MEDIUM

BACKGROUND

1. Technical Field

The present invention relates to a display system including an image output apparatus and an image display apparatus, a method of controlling the image output apparatus and image display apparatus, and a recording medium on which a control program is recorded.

2. Related Art

Heretofore, a display system including an image output apparatus and an image display apparatus which displays an image input from the image output apparatus has been known. With this kind of display system, it is common that the image output apparatus and image display apparatus are connected by an image cable through which an image signal is transmitted. However, with this kind of connection type, it is possible to transmit only an image from the image output apparatus to the image display apparatus. For this reason, when the image display apparatus is controlled by the image output apparatus, it is necessary to provide a control cable separately and transmit a control signal from the image output apparatus to the image display apparatus.

As opposed to this, a display system is known wherein control information for controlling the image display apparatus is set in an image, and the image is output to the image display apparatus (for example, JP-A-2009-92999).

With the display system described in JP-A-2009-92999, a PC which is an image output apparatus (an image supply apparatus) and a projector which is an image display apparatus are connected by an image cable. Then, the PC displays a control screen, and generates a two-dimensional code for controlling the projector in accordance with an input operation with respect to the control screen. Then, the PC generates an image including the two-dimensional code, and outputs the image to the image display apparatus. Meanwhile, the projector, by detecting the two-dimensional code from the input image and analyzing it, carries out a control based on control information indicated by the two-dimensional code. Because of this, it is possible to control the projector by means of the PC without using a communication cable.

However, with the display system described in JP-A-2009-92999, as the two-dimensional code for controlling the projector is set in the image displayed by the projector, there is a problem in that an observer is likely to feel that something is odd.

SUMMARY

An advantage of some aspects of the invention is to provide a display system, an image output apparatus, a control method, and a recording medium, with which it is possible to control an image display apparatus without control information being displayed.

A display system according to a first aspect of the invention includes an image output apparatus and an image display apparatus. The image output apparatus has a display image generating unit which generates a display image which is an image which the image display apparatus is caused to display, a control image generating unit which generates a control image which is an image including control information for controlling the image display apparatus, and an image output unit which outputs the display image and control image to the image display apparatus. The image display apparatus has a display unit which displays the input display image, a control information acquisition unit which acquires the control information included in the input control image, and a drive control unit which, based on the acquired control information, controls a drive of the image display apparatus.

According to the first aspect of the invention, the control information for controlling the image display apparatus is input into the image display apparatus from the image output apparatus in a form in which the control information is included in the control image. According to this, it is not necessary to provide a communication cable in addition to an image cable through which an image signal is transmitted. Consequently, it is possible to easily carry out a connection of the image output apparatus and image display apparatus.

Also, with the image display apparatus, of the display image and control image output from the image output apparatus, the display image is displayed by the display unit. Meanwhile, the control image is used for an acquisition of the control information by the control information acquisition unit, and the drive control unit carries out a control corresponding to the control information. According to this, it does not happen that the control image in which the control information is included is displayed. Consequently, it is possible to control the image display apparatus by means of the image output apparatus without the control information being displayed by the image display apparatus.

According to the first aspect of the invention, it is preferable that the display image generating unit generates the display image at a predetermined timing, and that the image output unit, based on the predetermined timing, outputs the control image.

According to the first aspect of the invention, the control image is output by the image output unit based on a timing at which the display image is generated. According to this, for example, when the control image is output between display image frames (in a period from the previous frame being output until the next frame is output), it does not happen that the output of the display images is interrupted. Also, when the display image frames and control images are output alternately, as either a display image or a control image is input into the image display apparatus in a certain input cycle, it is possible to increase an input frame rate for the image display apparatus, and it is possible to output a larger number of display images to the image display apparatus. Furthermore, when some of frames to be output to the image display apparatus are output as display images, and the remainder are output as control images, apart from it being possible to cause the control images to be input into the image display apparatus without the input of the display images being interrupted, it is possible to easily increase the input rate of the display images. Consequently, it is possible to control the image display apparatus by means of the image output apparatus while appropriately carrying out an image display by the image display apparatus.

According to the first aspect of the invention, it is preferable that the image output apparatus has an operating unit which outputs a control signal which controls the image display apparatus in accordance with an input operation, a control signal determination unit which determines whether or not the control signal has been input, and a control information generating unit which, when it is determined that the control signal has been input, generates the control information corresponding to the control signal, wherein the control image generating unit, when it is determined by the control signal determination unit that the control signal has been input, generates the control image including the control information.

According to the first aspect of the invention, on the control signal being input from the operating unit in accordance with an input operation, the control information based on the control signal is generated by the control information generating unit, and the control image including the control information is generated by the control image generating unit. According to this, by the control image being output into the image display apparatus at a timing at which an input operation with respect to the operating unit is carried out, it is possible to carry out a control of the image display apparatus corresponding to the input operation.

According to the first aspect of the invention, it is preferable that the control image generating unit, when it is determined by the control signal determination unit that the control signal has not been input, generates a dummy image not including the control information, and that the image output unit, when it is determined by the control signal determination unit that the control signal has been input, outputs the control image at a timing differing from the timing at which the display image is output, and when it is determined that the control signal has not been input, outputs the dummy image at a timing differing from the timing at which the display image is output.

According to the first aspect of the invention, either the control image including the control information based on a control signal input from the operating unit or the dummy image not including the control image is output at a timing differing from the timing at which the display image is output. According to this, it is possible to reliably execute a control of the image display apparatus without the output of the display images to the image display apparatus being interrupted. Also, by the display image and the dummy image and control image being alternately output in this way, it is possible to cyclically execute the image output without the image output timings being off. Consequently, it is possible to make it easy to synchronize the image input and output between the image output apparatus and image display apparatus.

Alternatively, according to the first aspect of the invention, it is preferable that the control image generating unit generates the control image including a predetermined pattern and the control information, and that the image display apparatus has an image determination unit which determines that the image is the control image when the predetermined pattern is included in an input image, and determines that the image is the display image when the predetermined pattern is not included.

According to the first aspect of the invention, as the image display apparatus, with the pattern as an index, easily determines whether an input image is the display image or control image, it is possible to reliably cause the control image in which the control information is included to be recognized, and it is possible to reliably cause a process based on the control information to be executed. Also, as it is sufficient that the image output apparatus carries out a generation and output of the control image at a timing at which a control signal is input, it is possible to reduce the number of frames of images generated and output by the image output apparatus in comparison with the case of generating the dummy image. Consequently, it is possible to reduce a processing burden on the image output apparatus.

An image output apparatus according to a second aspect of the invention, which outputs an image, includes a display image generating unit which generates a display image which is an image which an image display apparatus is caused to display, a control image generating unit which generates a control image which is an image including control information for controlling the image display apparatus, and an image output unit which outputs the display image and control image to the image display apparatus.

According to the second aspect of the invention, by combining the image display apparatus, which displays the input display image and executes a control based on the control information acquired from the input control image, and the image output apparatus, it is possible to achieve the same advantages as those of the display system.

A control method according to a third aspect of the invention, by which an image display apparatus connected to an image output apparatus is controlled by the image output apparatus, includes generating a display image which is an image which the image display apparatus is caused to display, generating a control image which is an image including control information for controlling the image display apparatus, and outputting the display image and control image to the image display apparatus.

According to the third aspect of the invention, by combining the image output apparatus to which the control method is applied and the image display apparatus, it is possible to achieve the same advantages as those of the display system.

A recording medium according to a fourth aspect of the invention is a recording medium on which a control program which controls an image display apparatus connected to an image output apparatus is recorded so as to be readable by the image output apparatus. The control program recorded causes the image output apparatus to execute a display image generating step which generates a display image which is an image which the image display apparatus is caused to display, a control image generating step which generates a control image which is an image including control information for controlling the image display apparatus, and an image output step which outputs the display image and control image to the image display apparatus.

According to the fourth aspect of the invention, by combining the image output apparatus which causes the control program to be executed and the image display apparatus, it is possible to achieve the same advantages as those of the display system.

By this kind of control program being recorded on a recording medium, such as a magnetic tape such as a digital audio tape (DAT), a magnetic disc such as a flexible disc (FD), an optical disc such as a compact disc (CD) or a digital versatile disc (DVD), a magnetooptic disc, a hard disk drive (HDD), or a semiconductor memory, apart from it being possible to install and execute the control program in the image output apparatus utilizing the recording medium, it is possible to easily carry out a distribution of the control program.

A control method according to a fifth aspect of the invention, which controls an image display apparatus which displays an input image, includes determining whether or not control information for controlling the image display apparatus is included in the input image, displaying the input image when it is determined that the control information is not included, acquiring the control information included in the input image when it is determined that the control information is included, and controlling a drive of the image display apparatus based on the acquired control information.

According to the fifth aspect of the invention, by combining the image output apparatus and the image display apparatus to which the control method is applied, it is possible to achieve the same advantages as those of the display system.

BRIEF DESCRIPTION OF THE DRAWINGS

The invention will be described with reference to the accompanying drawings, wherein like numbers reference like elements.

DESCRIPTION OF EXEMPLARY EMBODIMENTS

1. First Embodiment

Hereafter, a description will be given of a first embodiment of the invention, based on the drawings.
Overall Configuration of Display System FIG. 1 is a block diagram showing a configuration of a display system 1 according to the embodiment.

Figure 1:
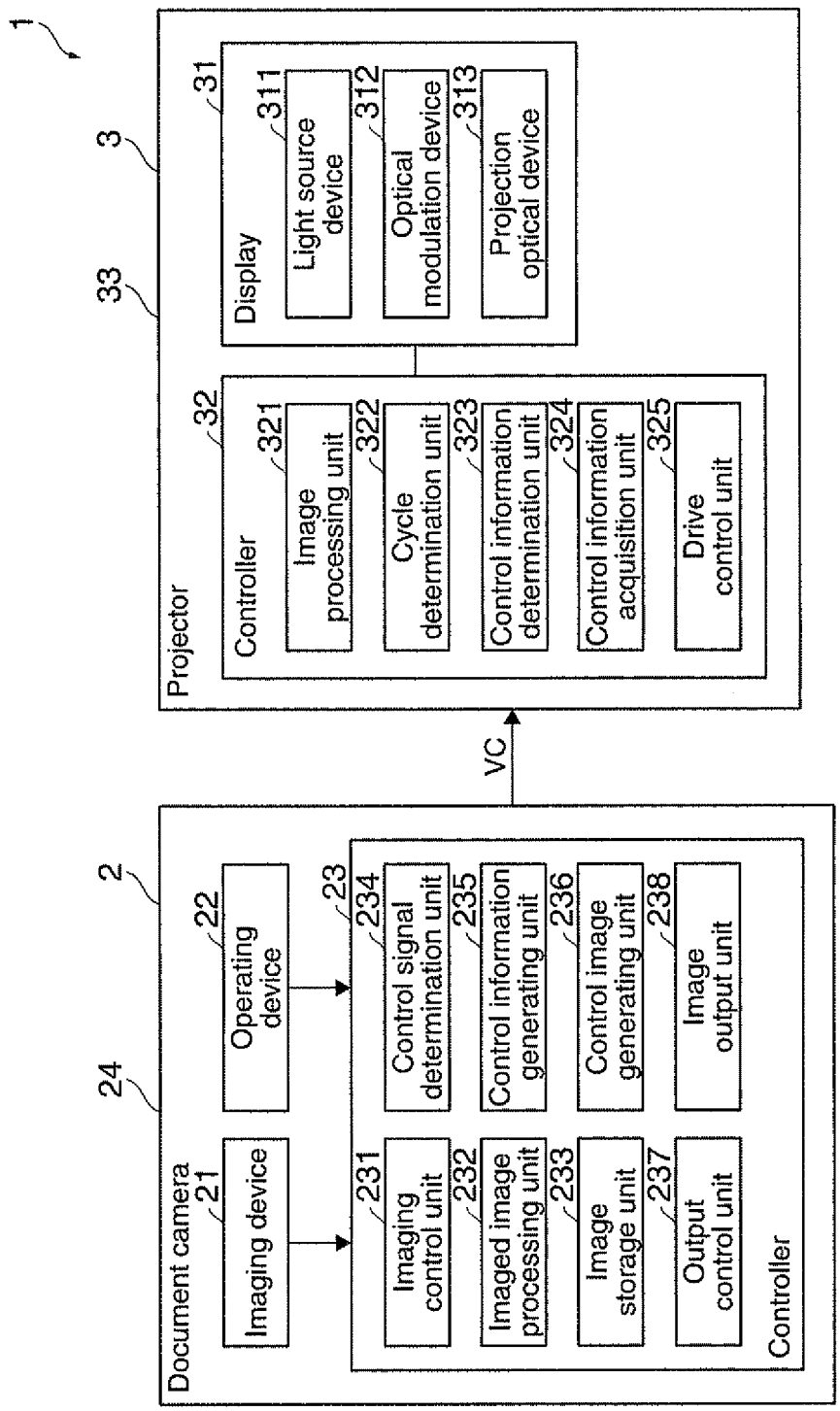
FIG. 1 is a block diagram showing a configuration of a display system according to a first embodiment of the invention.

The display system 1 according to the embodiment includes a document camera 2 which outputs an image, wherein a predetermined region is imaged, as a display image, and a projector 3 which displays the display image, as shown in FIG. 1. Then, in the display system 1, as will hereafter be described in detail, while the projector 3 is displaying the display image, a control image including control information corresponding to an input operation with respect to an operating device 22 is output from the document camera 2 to the projector 3, and the projector 3 carries out an operation corresponding to the control information. The document camera 2 and projector 3 are connected by an image cable VC through which an image signal is transmitted and, as the image cable VC, it is possible to employ any kind of cable, such as a D-subminiature (D-sub) cable, a digital visual interface (DVI) cable, a high-definition multimedia interface (HDMI) cable, a composite video cable, a component video cable or a universal serial bus (USB) cable. Also, as the image cable VC, it is also possible to employ any kind of local area network (LAN) cable including an unshielded twisted pair (UTP) type cable. In the embodiment, the document camera 2 and projector 3 are connected by a USB cable.
Configuration of Document Camera FIGS. 2 and 3 are perspective views showing the document camera 2.

Figure 2:
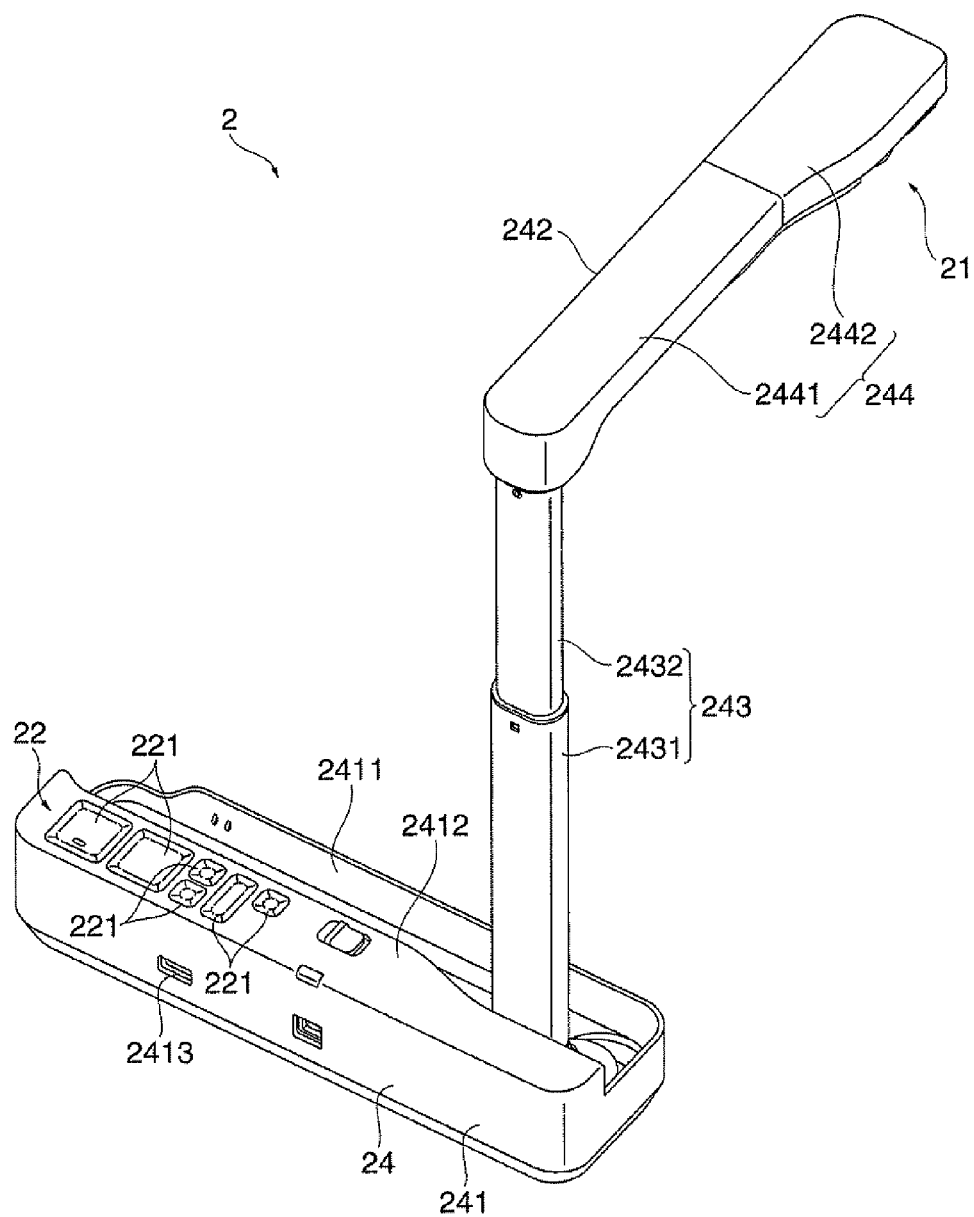
FIG. 2 is a perspective view showing a document camera in the embodiment.
Figure 3:
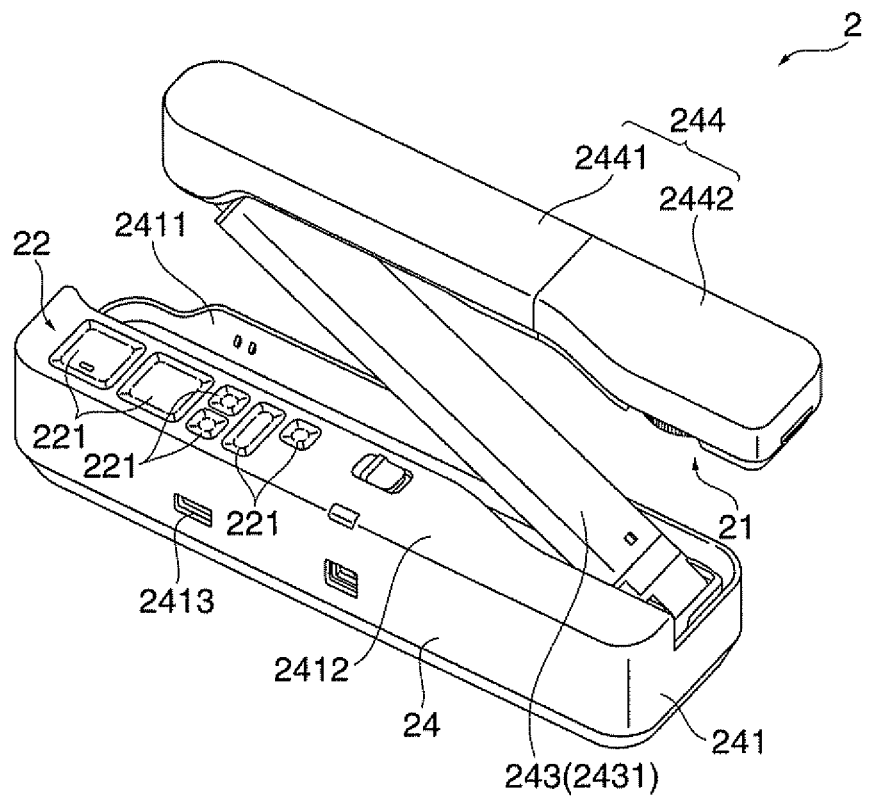
FIG. 3 is a perspective view showing the document camera in the embodiment.

The document camera 2 includes an imaging device 21, the operating device 22, a controller 23 (FIG. 1), and a housing 24, as shown in FIGS. 1 to 3.

Of these, the housing 24 is formed from a synthetic resin, and the housing 24 has a housing main body 241 and a support portion 242 supporting the imaging device 21, as shown in FIGS. 2 and 3.

The housing main body 241 has an approximately rectangular shape in a plan view. The housing main body 241 has a recessed portion 2411 opening upward.

The operating device 22 is provided on a top surface 2412 of the housing main body 241. The operating device 22, being configured as an operating panel on which a plurality of keys 221 are disposed, outputs a control signal corresponding to an input operation of the keys 221 to the controller 23. As these kinds of key 221, the operating device 22 includes a stand-by key, a picture source switching key, a zoom key, an image quality adjustment key, and the like.

Furthermore, a terminal 2413 to which is connected the image cable (USE cable) connected to the projector 3 is provided on one side surface of the housing main body 241.

The support portion 242 has a first arm 243 and a second arm 244, and a cable (not shown) connecting the imaging device 21 mounted on the second arm 244 and the controller 23 provided in the housing main body 241 is provided inside the arms 243 and 244.

The first arm 243 has a first shaft-like portion 2431, provided at one longitudinal end in the recessed portion 2411 in such a way as to be tiltable toward the recessed portion 2411 and rotatable centered on an axial direction thereof, and a second shaft-like portion 2432 provided in such a way as to be protrudable from and retractable into the first shaft-like portion 2431 in the axial direction of the first shaft-like portion 2431. The first arm 243 is configured so as to be telescopic by means of the shaft-like portions 2431 and 2432.

The second arm 244 has a pivotal portion 2441 and a holding portion 2442.

The pivotal portion 2441 is mounted at the leading end (an end on the side opposite to the housing main body 241) of the first arm 243 (specifically, the second shaft-like portion 2432). The pivotal portion 2441 is mounted so as to be pivotable centered on, and bendable in a direction perpendicular to, an axial direction of the second shaft-like portion 2432.

The holding portion 2442 is mounted on the side opposite to a portion of the pivotal portion 2441 connected to the second shaft-like portion 2432 so as to be rotatable centered on a direction in which the pivotal portion 2441 extends from the second shaft-like portion 2432. The holding portion 2442 holds the imaging device 21 and a lighting unit (not shown), such as a light emitting diode (LED), which lights a subject to be imaged by the imaging device 21.

By the first arm 243 being tilted toward the recessed portion 2411, and the second arm 244 being pivoted around the first arm 243, in a condition in which the second shaft-like portion 2432 is retracted into the first shaft-like portion 2431, as shown in FIG. 3, this kind of support portion 242 is folded and housed in the recessed portion 2411. At this time, the housing 24 attains an approximately rectangular parallelepiped shape as a whole.

The imaging device 21 outputs an image, wherein an imaging subject in an imaging region is imaged, to the controller 23. The imaging device 21 includes an imaging element configured of a 3CCD device, and an optical unit configured of a plurality of lenses. As an imaging element to be employed for the imaging device 21, without being limited to a charge coupled device (CCD), another imaging element, such as a complementary metal oxide semiconductor (CMOS), may be employed.

Returning to FIG. 1, the controller 23 is housed in the housing main body 241 (FIGS. 2 and 3). The controller 23, being configured as a circuit board mounted with a central processing unit (CPU), a random access memory (RAM), and a read only memory (ROM), controls the whole of the document camera 2. The controller 23 includes an imaging control unit 231, an imaged image processing unit 232, an image storage unit 233, a control signal determination unit 234, a control information generating unit 235, a control image generating unit 236, an output control unit 237, and an image output unit 238.

The imaging control unit 231 causes the imaging device 21 to image the imaging region at a predetermined timing and output an imaged image to the controller 23. In the embodiment, the imaging control unit 231 causes the imaging device 21 to image the imaging region repeatedly in a display image generation cycle to be described hereafter.

The imaged image processing unit 232 corresponds to a display image generating unit of some aspects of the invention. The imaged image processing unit 232 processes an imaged image input from the imaging device 21, generates a display image, which the projector 3 is caused to display, for each frame, and causes the image storage unit 233 to store the display images.

The image storage unit 233 temporarily stores the display images generated by the imaged image processing unit 232.

The control signal determination unit 234, by determining whether or not a control signal has been input from the operating device 22, determines whether or not an input operation by a user has been carried out with respect to the operating device 22.

When it is determined by the control signal determination unit 234 that a control signal has been input, the control information generating unit 235 generates control information corresponding to the control signal. Specifically, the control information generating unit 235 generates an image, wherein details of the control signal are encoded, as the control information. In the embodiment, the control information generating unit 235 generates a two-dimensional code as the image.

The control image generating unit 236 generates images (inset images) to be inset between display image frames. At this time, when it is determined by the control signal determination unit 234 that a control signal has been input, the control image generating unit 236 generates a control image, wherein the control information (two-dimensional code) generated by the control information generating unit 235 is set in a predetermined template image, as the inset image. Also, when it is determined that no control signal has been input, the control image generating unit 236 generates a dummy image, wherein the template image, that is, the control information, is not set, as the inset image.

Specifically, image data representing the template image necessary for the control image generating unit 236 to generate the inset image, and image data representing a predetermined pattern PT, to be described hereafter, are each stored in unshown nonvolatile storage devices and, as necessary, transferred to predetermined regions allotted in an unshown RAM. Then, the control image generating unit 236, using the image data retrieved from the predetermined regions, generates each of the control image and dummy image at a predetermined timing. The nonvolatile storage devices can be configured of any kind of semiconductor memory (such as an ROM), a hard disk drive (HDD), or the like.

Figure 4:
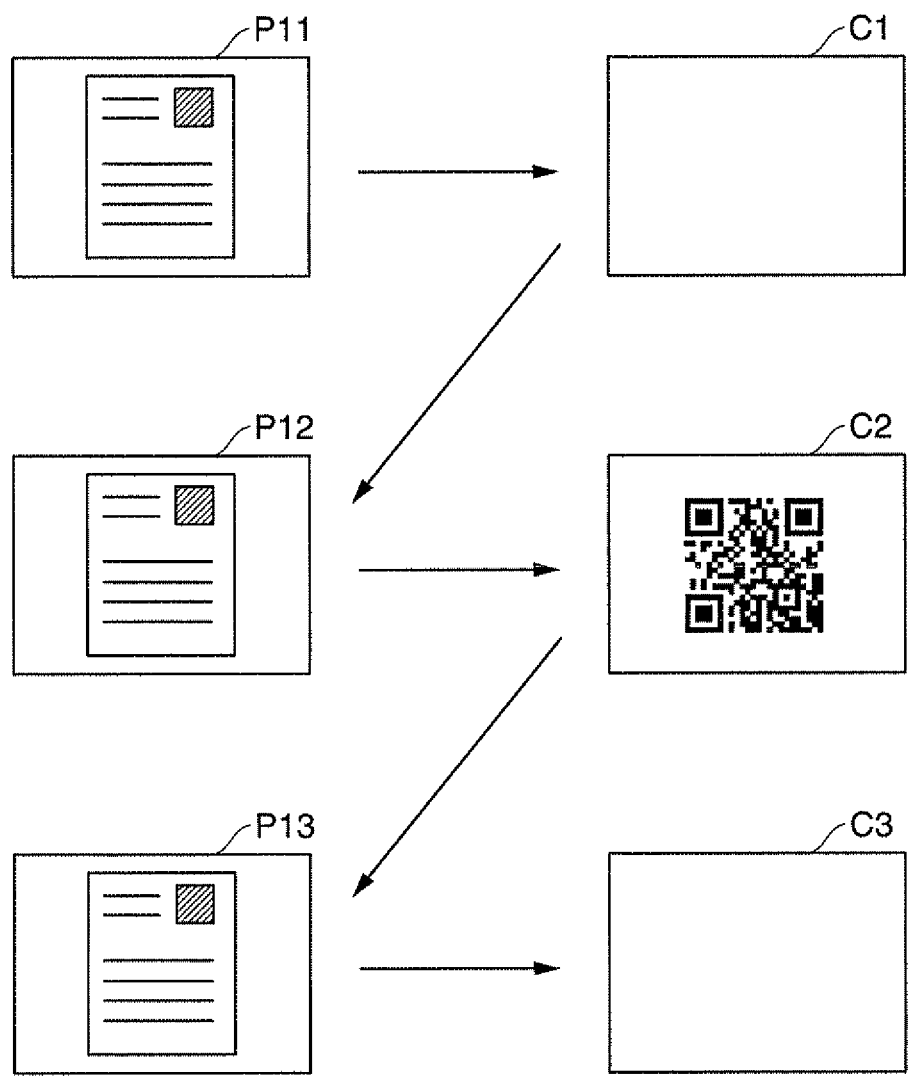
FIG. 4 is a diagram showing images output from an image output unit in the embodiment.

FIG. 4 is a diagram showing images output from the image output unit 238 under a control of the output control unit 237.

The output control unit 237 controls an output of generated display images and inset images by the image output unit 238, and the image output unit 238 outputs the display images and inset images to the projector 3. Specifically, as shown in FIG. 4, the output control unit 237 controls the image output unit 238 in such a way that the image output unit 238 outputs each of inset images C1 to C3 generated by the control image generating unit 236 between output timings at which frames of display images P11 to P13 (images wherein print is imaged) are sequentially output. That is, the inset images C1 to C3 are inset among the display images P11 to P13, and the display images P11 to P13 and inset images C1 to C3 are output.

The inset images C1 and C3, among the inset images C1 to C3, are the dummy images, and the inset image C2 is a control image in which is included a two-dimensional code which is control information (in other words, a control image generated in accordance with an input operation with respect to the operating device 22).

Under this kind of control by the output control unit 237, the image output unit 238 outputs the display images and inset images alternately to the projector 3. Then, a control image wherein control information is set is generated, and the control image is output to the projector 3, by the output control unit 237 and image output unit 238 at a timing at which an input operation is carried out with respect to the operating device 22.

Configuration of Projector

Figure 5:
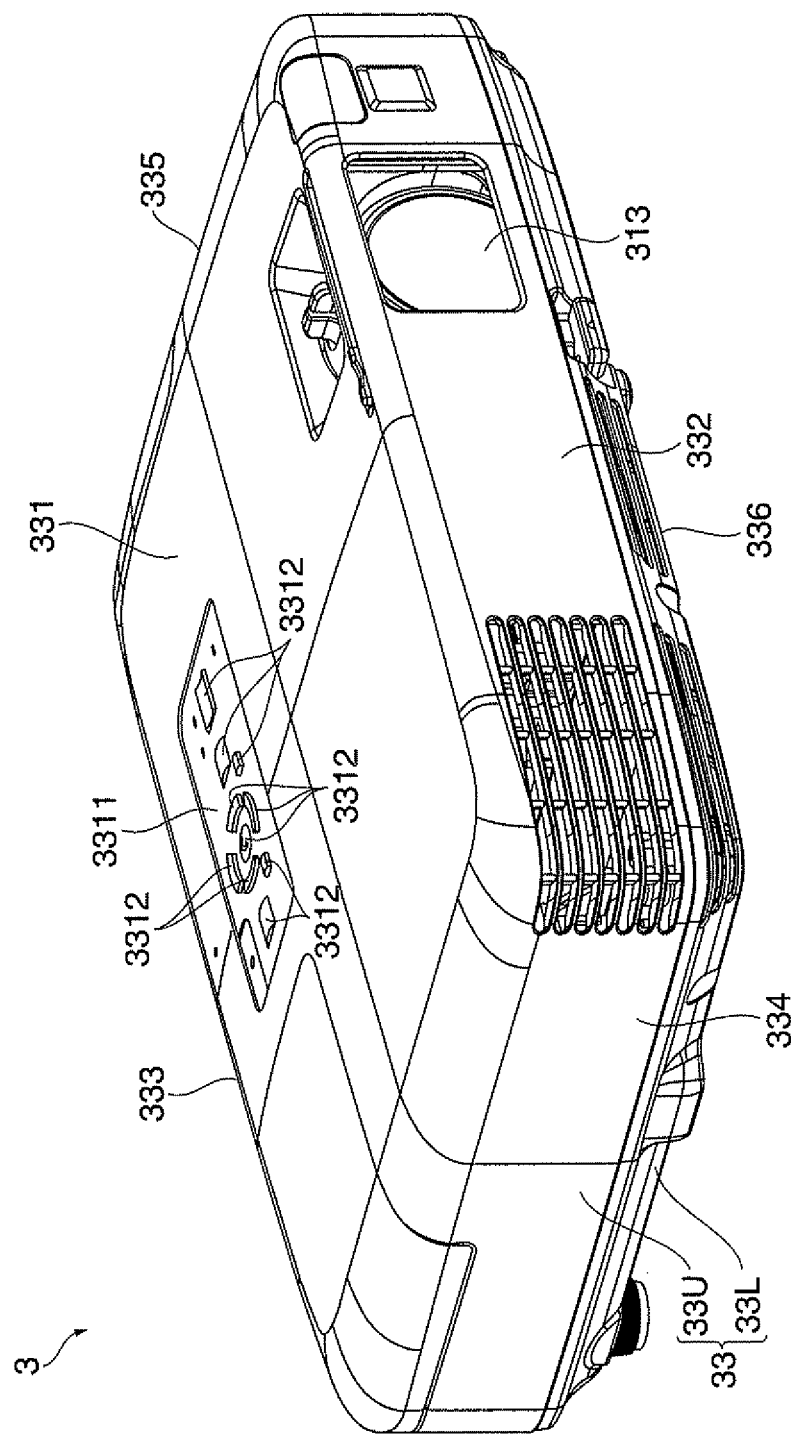
FIG. 5 is a perspective view showing a projector in the embodiment.
Figure 6:
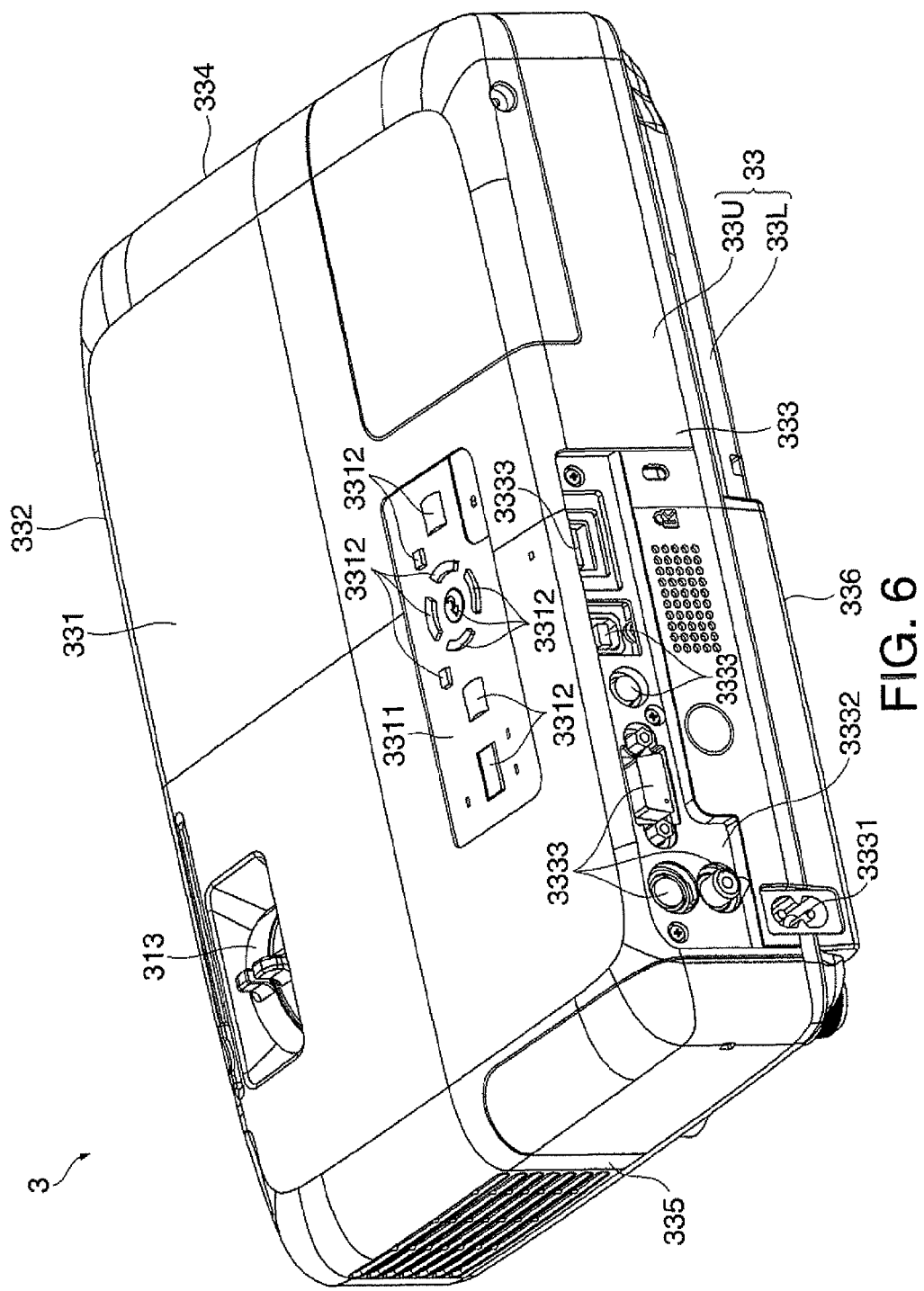
FIG. 6 is a perspective view showing the projector in the embodiment.

FIGS. 5 and 6 are perspective views showing an exterior of the projector 3. Specifically, FIGS. 5 and 6 are perspective views of the projector 3 seen from the upper front and the upper back.

The projector 3, as well as displaying display images, among images input from the document camera 2, carries out a process in accordance with a control image. The projector 3 has an exterior housing 33 configuring the exterior of the projector 3, and a display 31 and controller 32 (both in FIG. 1) housed in the exterior housing 33, as shown in FIGS. 1, 5, and 6.

The exterior housing 33 is a housing made of a synthetic resin and, as shown in FIGS. 5 and 6, the exterior housing 33 is configured by an upper casing 33U configuring the upper portion and a lower casing 33L configuring the lower portion being combined. The exterior housing 33 has a top surface portion 331, a front surface portion 332, a back surface portion 333, a left side surface portion 334, a right side surface portion 335, and a bottom surface portion 336.

The operating panel 3311 acting as an operating unit for implementing a start-up and adjustment operation of the projector 3 is provided on the top surface portion 331 in such a way as to extend in a left-right direction. A plurality of operating buttons 3312 configured of push-button switches are disposed on the operating panel 3311. Then, on the operating button 3312 being depressed, the operating button 3312 makes contact with a TACT switch mounted on an unshown circuit board disposed inside the operating panel 3311, and the circuit board outputs an operation signal corresponding to the depressed operating button 3312 to the controller 32.

A power connector 3331 into which an unshown power cable is inserted is provided in a lower right corner portion of the back surface portion 333, as shown in FIG. 6.

Also, an image signal input portion 3332, which is an input terminal group and in which are disposed various kinds of terminal 3333 to which the various kinds of image cable are to be connected, is provided in a position of the back surface portion 333 on the right side and a side adjacent to the top surface portion 331.

Returning to FIG. 1, the display 31, corresponding to a display unit of some aspects of the invention, generates and projects an image corresponding to a drive signal input from the controller 32. The display 31 includes a light source device 311, an optical modulation device 312, and a projection optical device 313.

The light source device 311, including a light source lamp, such as a high pressure mercury-vapor lamp, and a reflector, which is a reflecting mirror, or a solid light source, such as an LED, irradiates the optical modulation device 312 with a luminous flux.

The optical modulation device 312 includes, although not shown, a liquid crystal panel which modulates the luminous flux emitted from the light source device 311 and forms an image, and a driver which drives the liquid crystal panel in accordance with an input drive signal. The optical modulation device 312, not being limited to a configuration including a liquid crystal panel, may employ a configuration other than liquid crystal, such as a device using a micromirror.

The projection optical device 313 enlarges and projects the image formed by the optical modulation device 312. The projection optical device 313 is configured as a combined lens including a mirror barrel and a plurality of lenses housed in the mirror barrel.

The controller 32, being configured as a circuit board which controls the whole of the projector 3, for example, processes an image input from the document camera 2, and outputs a drive signal corresponding to the display image to the display 31. This kind of controller 32 has an image processing unit 321, a cycle determination unit 322, a control information determination unit 323, a control information acquisition unit 324, and a drive control unit 325.

The image processing unit 321 draws images, input from the document camera 2 via the image signal input unit 3332, in an unshown frame memory.

The cycle determination unit 322 determines whether or not an input cycle of the images input from the document camera 2 coincides with a cycle in which display images are input. That is, the cycle determination unit 322 determines whether or not the input images are the display images.

When it is determined by the cycle determination unit 322 that the input cycle does not coincide with the cycle in which the display images are input, the control information determination unit 323, referring to the images drawn by the image processing unit 321, determines whether or not control information is included in the input images (inset images).

When it is determined by the control information determination unit 323 that control information is included, the control information acquisition unit 324 acquires the control information. In the embodiment, the control information acquisition unit 324 acquires the two-dimensional code and, by analyzing the two-dimensional code, acquires the control information.

The drive control unit 325 outputs a drive signal, input at a timing at which a display image is output by the document camera 2, and corresponding to the display image drawn in the frame memory by the image processing unit 321, to the display 31, and causes the display 31 to display the display image. Also, the drive control unit 325, based on the control information acquired by the control information acquisition unit 324, controls a drive of the projector 3. For example, when control information generated in accordance with an input operation of the image quality adjustment key is acquired, the drive control unit 325, based on the control information, causes the image processing unit 321 to execute an image quality adjustment process. Also, when control information generated in accordance with an input operation of the zoom key is acquired, the drive control unit 325, based on the control information, causes an unshown zoom mechanism to execute a zooming-in/zooming-out of a projection image.

Process of Document Camera

Figure 7:
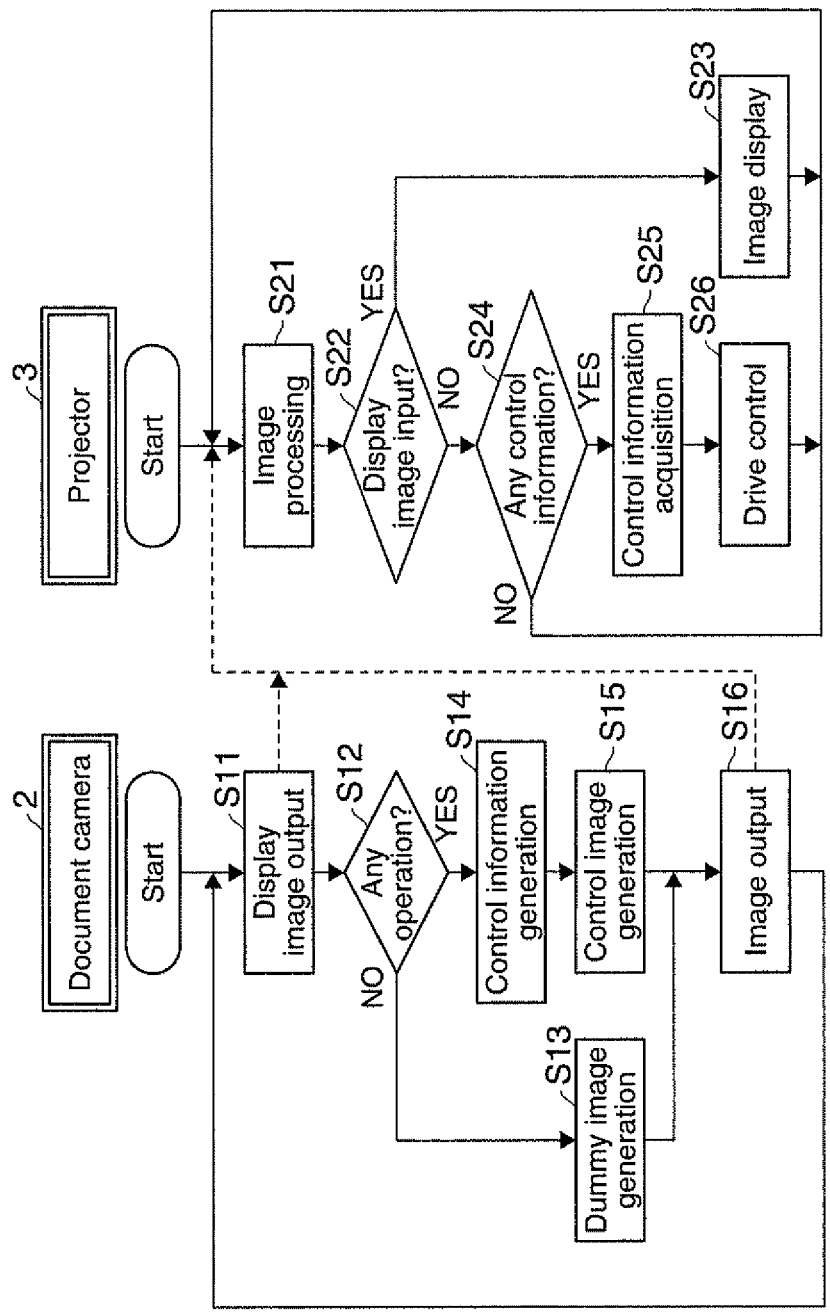
FIG. 7 is a flowchart showing control processes carried out by the document camera and projector in the embodiment.

FIG. 7 is a flowchart showing control processes carried out by the document camera 2 and projector 3.

Each of the document camera 2 and projector 3 reads a control program stored in an unshown memory, and executes the following control process by means of the heretofore described configuration.

In the control process, with the document camera 2, as shown in FIG. 4, firstly, the imaged image processing unit 232 acquires an image imaged by the imaging device 21 under a control of the imaging control unit 231, and generates a display image. Then, the image output unit 238, under a control of the output control unit 237, outputs the generated display image to the projector 3 (step S11).

Subsequently, the control signal determination unit 234 determines whether or not a control signal has been input from the operating device 22 (step S12).

Herein, if it is determined that no control signal has been input, the control image generating unit 236 generates a dummy image as an inset image (step S13). Then, the controller 23 shifts the process to step S16.

Meanwhile, if it is determined that a control signal has been input, the control information generating unit 235 generates control information (a two-dimensional code) based on the control signal (step S14), and the control image generating unit 236 generates a control image, in which the control information is included, as an inset image (step S15). Subsequently, the controller 23 shifts the process to step S16.

In step S16, under a control of the output control unit 237, the image output unit 238 outputs the generated inset image to the projector 3 (step S16). Because of this, when a dummy image is generated as an inset image, the dummy image is output by the image output unit 238, and when a control image is generated, the control image is output by the image output unit 238.

Subsequently, the controller 23 returns the process to step S11, the imaging control unit 231 causes an imaging by the imaging device 21 to be executed again, and a display image based on the imaged image is output by the image output unit 238. For this reason, the dummy image or control image is output to the projector 3 between display image frames.

Process of Projector

With the projector 3, the image processing unit 321 draws input images in the frame memory (step S21), and the cycle determination unit 322 determines whether or not an input cycle of the input images coincides with a display image input cycle (step S22).

Herein, if it is determined that the image input cycle coincides with the display image input cycle, the controller 32 recognizes that a display image has been input. Then, the drive control unit 325 outputs a drive signal based on the image drawn in the frame memory to the display 31, and causes the display 31 to display the image (step S23). Subsequently, the controller 32 returns the process to step S21.

Meanwhile, if it is determined that the image input cycle does not coincide with the display image input cycle, the controller 32 recognizes that an inset image has been input.

Then, the control information determination unit 323 determines whether or not control information (a two-dimensional code) is included in the inset image (step S24).

Herein, if it is determined that no control information is included, the controller 32 recognizes that a dummy image has been input, and returns the process to step S21. That is, when a dummy image is input, the controller 32, without doing anything, returns the process to step S21.

Meanwhile, if it is determined that control information is included, the control information acquisition unit 324 acquires and analyzes the control information (two-dimensional code) (step S25).

Then, the drive control unit 325 carries out a control corresponding to the acquired control information (step S26). Subsequently, the controller 32 returns the process to step S21.

Because of this, the display images output from the document camera 2 are processed and displayed by the projector 3, while the inset images output from the document camera 2 are processed without being displayed by the projector 3, and a process corresponding to the control information included in the control image is executed by the projector 3.

According to the display system 1 of the embodiment, there are the following advantages.

Control information for controlling the projector 3 is made an image as a two-dimensional code, and a control image in which the two-dimensional code is set is input into the projector 3 from the document camera 2. According to this, it is not necessary to provide a communication cable, through which a control signal is transmitted, separately apart from the image cable VC. Consequently, it is possible to easily carry out a connection of the document camera 2 and projector 3.

The display 31 of the projector 3 displays input display images. Also, the control information acquisition unit 324 acquires control information from the input control image, and the drive control unit 325 carries out a control of the projector 3 corresponding to the control information. According to this, it does not happen that the control image in which the control information is included is displayed. Consequently, it is possible to control the projector 3 by means of the document camera 2 without the control image being observed by an observer.

Also, as a control image is output between frames of display images, it does not happen that an output of the display images is interrupted. Consequently, it is possible to carry out a control of the projector 3 by means of the document camera 2 while carrying out an image display by the projector 3.

When it is determined by the control signal determination unit 234 that a control signal has been input from the operating device 22, the control information generating unit 235 generates control information based on the control signal, and the control image generating unit 236 generates a control image including the control information. According to this, it is possible to generate and output a control image at a timing at which an input operation is carried out with respect to the operating device 22. Consequently, it is possible to quickly carry out a control of the projector 3 corresponding to an input operation carried out with respect to the operating device 22.

A control image or a dummy image is inset between display image frames to be output. According to this, as each image is sequentially output from the document camera 2, it is possible to cyclically carryout the image outputs without timings at which the images are output being off. Consequently, it is possible to make it easy to synchronize an image input and output between the document camera 2 and projector 3.

2. Second Embodiment

Next, a description will be given of a second embodiment of the invention.

A display system according to the embodiment includes the same configuration as in the display system 1. Herein, with the display system 1, a configuration is such that frames of inset images are always inset between frames of display images, and the display images and inset images are alternately output to the projector 3. As opposed to this, with the display system according to the embodiment, a control image is generated at a timing at which an input operation is carried out with respect to an operating device, and the control image is output, inset between display image frames, to a projector. The display system according to the embodiment and the display system 1 differ in this point. In the following description, portions identical or approximately identical to the already described portions will be given identical reference numerals and characters, and a description will be omitted.

Configuration of Display System

Figure 8:
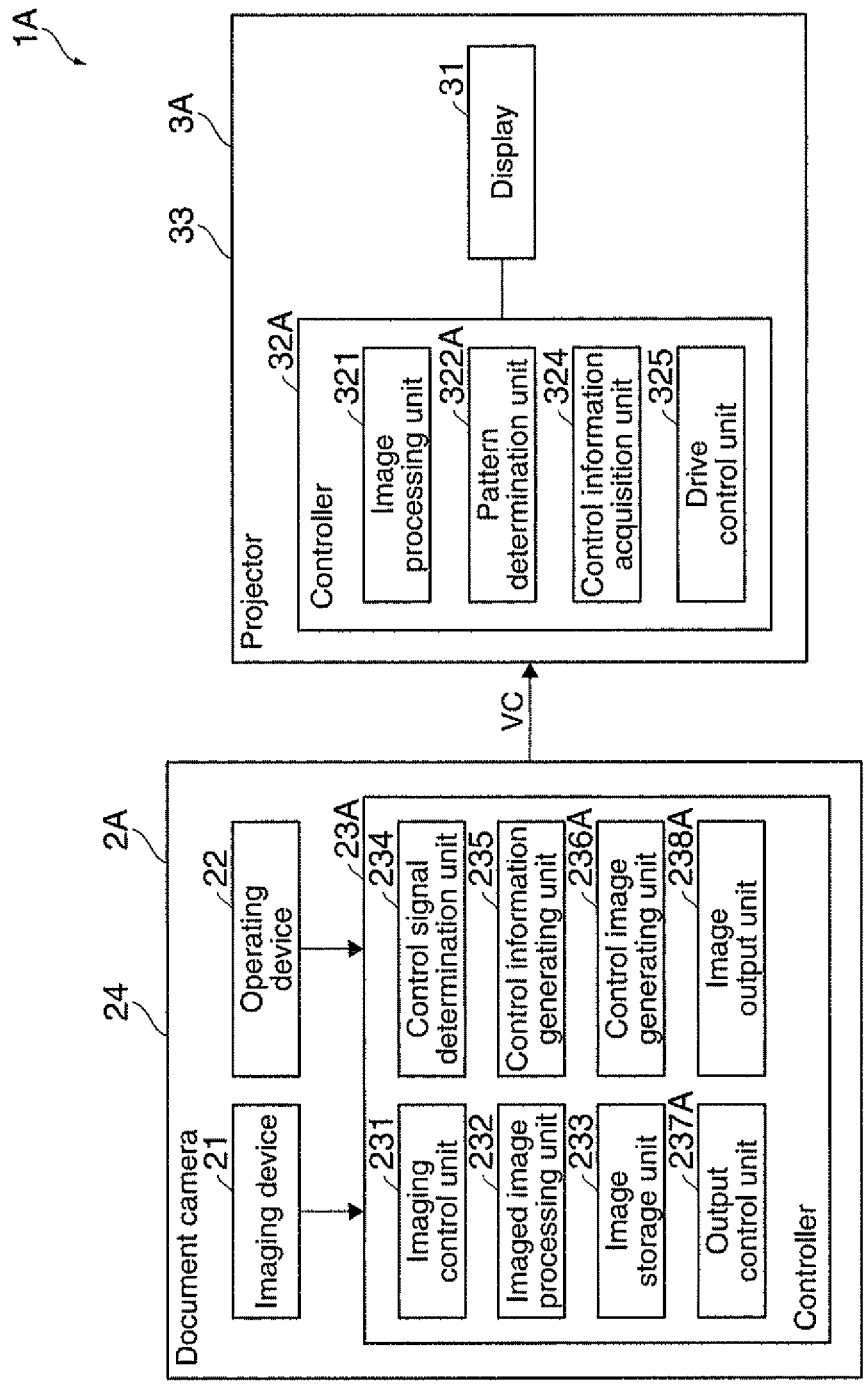
FIG. 8 is a block diagram showing a configuration of a display system according to a second embodiment of the invention.

FIG. 8 is a block diagram showing a configuration of a display system 1A according to the embodiment.

The display system 1A according to the embodiment, in the same way as the display system 1, includes a document camera 2A and a projector 3A, as shown in FIG. 8, and the projector 3A, while displaying display images input from the document camera 2A, executes a process corresponding to control information included in a control image input from the document camera 2A.

This kind of document camera 2A has the same configuration as the document camera 2 except that it has a controller 23A in place of the controller 23. Also, the controller 23A has the same configuration as that of the controller 23 except that it has a control image generating unit 236A, an output control unit 237A, and an image output unit 238A in place of the control image generating unit 236, output control unit 237, and image output unit 238.

When it is determined by the control signal determination unit 234 that a control signal has been input from the operating device 22, the control image generating unit 236A generates a control image. Specifically, the control image generating unit 236A generates a control image wherein a two-dimensional code which is control information generated by the control information generating unit 235 is set in a template image in which a predetermined pattern is set. The pattern is one for distinguishing between a display image and a control image. Unlike the control image generating unit 236, the control image generating unit 236A does not carry out the dummy image generation.

The output control unit 237A causes the image output unit 238A to output the display image for each frame stored in the image storage unit 233, and the control image generated by the control image generating unit 236A, to the projector 3A. Specifically, the output control unit 237A outputs each display image frame in a predetermined cycle but, when it is determined by the control signal determination unit 234 that a control signal has been input, insets the control image generated by the control image generating unit 236A between frames, and causes the image output unit 238A to output it to the projector 3A.

Figure 9:
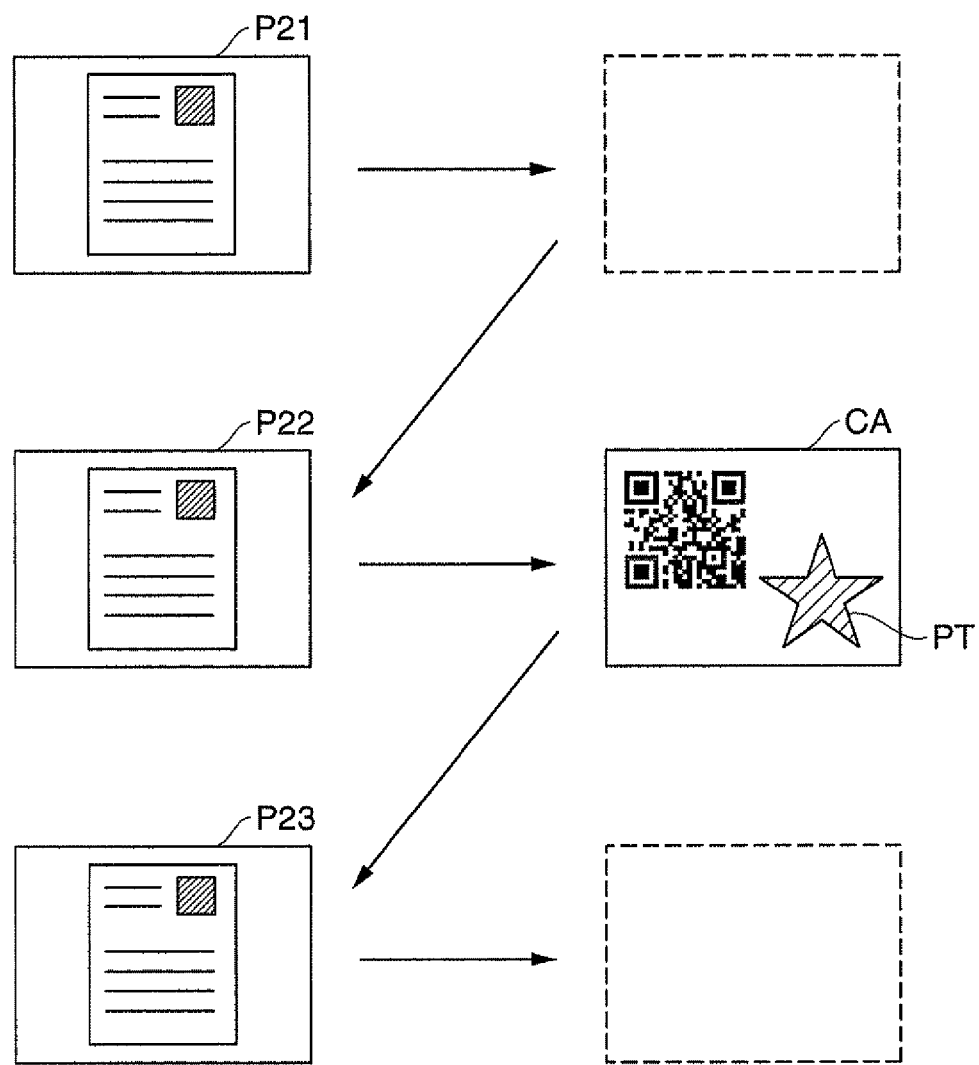
FIG. 9 is a diagram showing images output by an image output unit in the embodiment.

FIG. 9 is a diagram showing images output by the image output unit 238A under a control of the output control unit 237A.

For example, as shown in FIG. 9, when a frame of a display image P21 is output by the image output unit 238A, no dummy image is output thereafter, but a frame of a display image P22 is output after a predetermined time interval has passed. When the frame of the display image P22 is output, on a control signal being input by the operating device 22 being operated, control information (a two-dimensional code) corresponding to the control signal is generated by the control information generating unit 235, and a control image CA including the control information is generated. A predetermined pattern PT (in the embodiment, the star sign) is set in the control image CA. Then, the image output unit 238A, under a control of the output control unit 237A, outputs the control image CA and, at a next display image output timing, outputs a frame of a display image P23. At this time, as no control image is generated when no control signal is input, no control image or dummy image is output. In this way, a control image is generated when a control signal is input from the operating device 22, and output after being inset between display image frames at a timing at which the control signal is input.

Returning to FIG. 8, the projector 3A has the same configuration as that of the projector 3 except that it has a controller 32A in place of the controller 32. Also, the controller 32A has the same configuration as that of the controller 32 except that it has a pattern determination unit 322A in place of the cycle determination unit 322 and control information determination unit 323.

The pattern determination unit 322A determines whether or not the pattern PT is included in an image drawn in the frame memory by the image processing unit 321. Then, when it is determined by the pattern determination unit 322A that the pattern PT is included in the image, it is recognized that the image is a control image, and control information set in the image is acquired by the control information acquisition unit 324. Also, when it is determined by the pattern determination unit 322A that the pattern PT is not included in the drawn image, it is recognized that the image is a display image, and an output of a drive signal corresponding to the image by the drive control unit 325 is carried out.

Process of Document Camera

Figure 10:
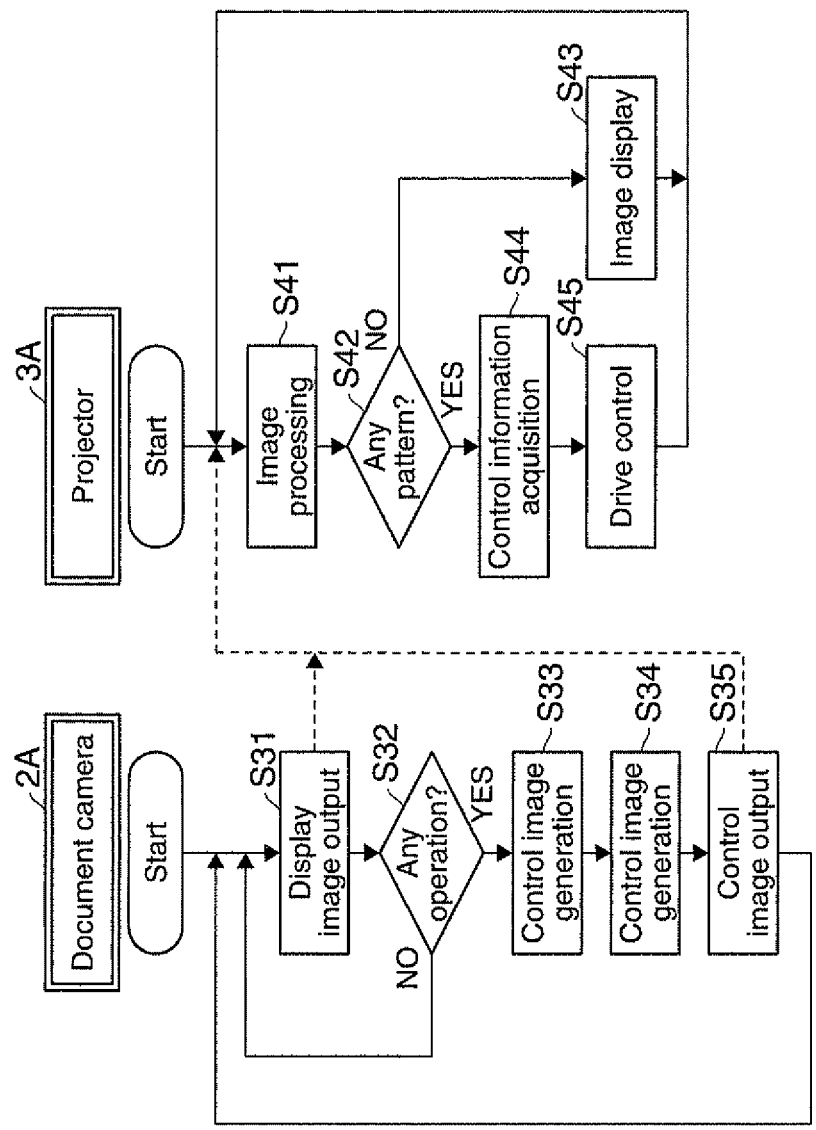
FIG. 10 is a flowchart showing control processes carried out by a document camera and a projector in the embodiment.

FIG. 10 is a flowchart showing control processes carried out in the document camera 2A and projector 3A.

Each of the document camera 2A and projector 3A reads a control program stored in an unshown memory, and executes the following process by means of the heretofore described configuration.

In the control process, with the document camera 2A, as shown in FIG. 10, firstly, the imaged image processing unit 232 acquires an image imaged by the imaging device 21 under a control of the imaging control unit 231, and generates a display image. Then, under a control of the output control unit 237A, the image output unit 238A outputs the display image to the projector 3A (step S31).

Subsequently, the control signal determination unit 234 determines whether or not the operating device 22 has been operated, that is, whether or not a control signal has been input from the operating device 22 (step S32).

Herein, if it is determined by the control signal determination unit 234 that no control signal has been input, the controller 23A returns the process to step S31. Then, an imaging by the imaging device 21 is carried out again and, at a next display image output timing, a display image based on an imaged image generated by the imaged image processing unit 232 is output to the projector 3A.

Meanwhile, if it is determined by the control signal determination unit 234 that a control signal has been input, the control information generating unit 235 generates control information (a two-dimensional code) based on the control signal (step S33). Then, the control image generating unit 236A generates a control image wherein the control information is set in the template image (step S34), and the image output unit 238A outputs the control image to the projector 3A (step S35).

Subsequently, the controller 23A returns the process to step S31 and, at a next display image output timing, a display image based on an imaged image generated by the imaged image processing unit 232 is output to the projector 3A.

Process of Projector

Meanwhile, with the projector 3A, as shown in FIG. 10, firstly, the image processing unit 321 processes an input image, and draws the image in the frame memory (step S41).

Subsequently, the pattern determination unit 322A determines whether or not the pattern PT exists in the image (step S42).

Herein, if it is determined that the pattern PT does not exist, the controller 32A recognizes that the input image is a display image, and the drive control unit 325 outputs a drive signal based on the display image to the display 31, and causes the display 31 to display the display image (step S43). Subsequently, the controller 32A returns the process to step S41.

Meanwhile, if it is determined that the pattern PT exists, the control information acquisition unit 324 acquires a two-dimensional code from the drawn image, analyzes it, and acquires control information indicated by the two-dimensional code (step S44).

Then, the drive control unit 325 executes a process corresponding to the acquired control information (step S45). Subsequently, the controller 32A returns the process to step S41, and waits to process of an image to be input next.

According to the display system 1A of the embodiment, apart from it being possible to achieve the same advantages as those of the display system 1, it is possible to achieve the following advantages.

As the projector 3A, with the pattern PT as an index, determines whether an input image is a display image or a control image, it is possible to reliably and easily distinguish between a display image and a control image. Consequently, it is possible to reliably execute a control based on control information included in the control image.

Also, as it is sufficient that the document camera 2A carries out a generation and output of a control image at a timing at which a control signal is input from the operating device 22, it is possible to reduce the number of frames of images generated and output by the document camera 2A in comparison with the case of generating the dummy image. Consequently, it is possible to reduce a processing burden on the document camera 2A.

3. Third Embodiment

Next, a description will be given of a third embodiment of the invention.

A display system according to the embodiment includes the same configuration as that of the display system 1. Herein, with the display system 1A, a configuration is such that a control image is inset between frames of display images output in a predetermined cycle, and the display images and control image are output to the projector. As opposed to this, with the display system according to the embodiment, a control image is replaced with a display image to be output. The display system according to the embodiment and the display system 1 differ in this point. In the following description, portions identical or approximately identical to the already described portions will be given identical reference numerals and characters, and a description will be omitted.

Configuration of Display System

Figure 11:
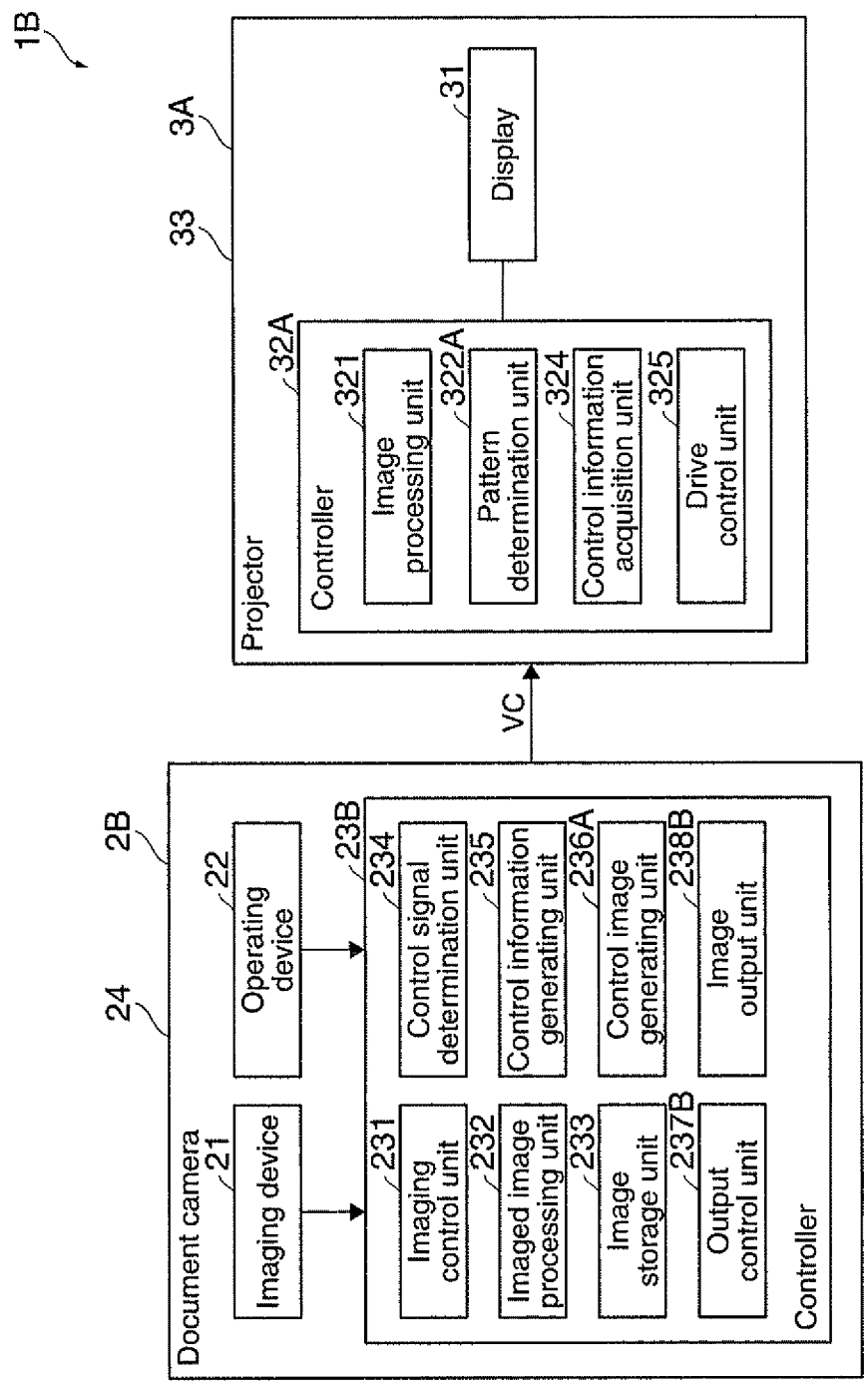
FIG. 11 is a block diagram showing a configuration of a display system according to a third embodiment of the invention.

FIG. 11 is a block diagram showing a configuration of a display system 1B according to the embodiment.

In the same way as the display system 1, the display system 1B according to the embodiment includes a document camera 2B and a projector 3A, as shown in FIG. 11, and the projector 3A, while displaying display images input from the document camera 2B, executes a process corresponding to control information included in a control image input from the document camera 2B.

This kind of document camera 2B has the same configuration as that of the document camera 2A except that it has a controller 23B in place of the controller 23A. Also, the controller 23B has the same configuration as that of the controller 23A except that it has an output control unit 237B and an image output unit 238B in place of the output control unit 237A and image output unit 238A.

The output control unit 2373 controls the image output unit 2383 in such a way as to output display images, generated by the imaged image processing unit 232 and stored in the image storage unit 233, to the projector 3A in a predetermined cycle. At this time, when it is determined by the control signal determination unit 234 that a control signal has been input, the output control unit 237B outputs a control image generated by the control image generating unit 236A, in place of the display image, to the projector 3A.

Figure 12:
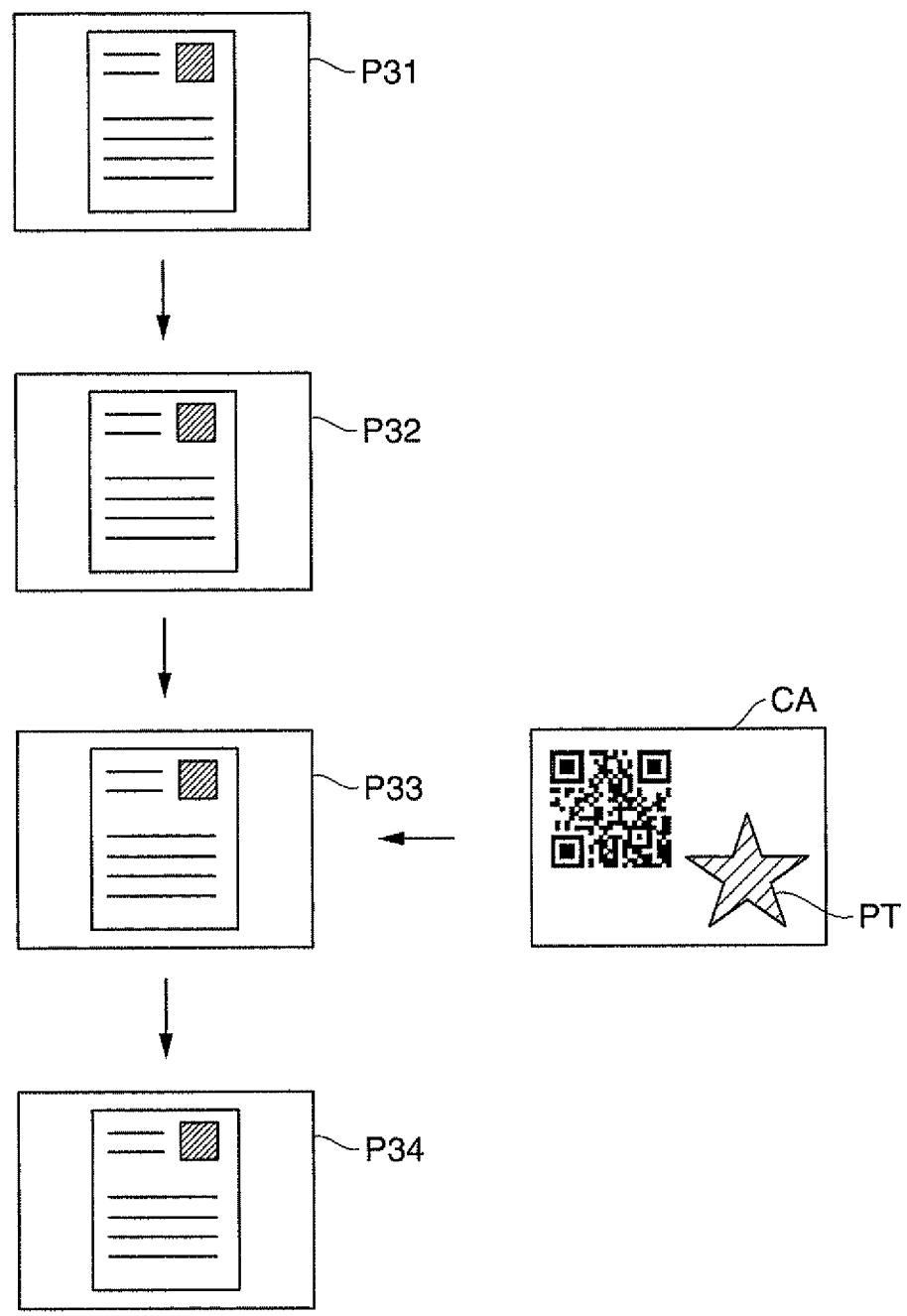
FIG. 12 is a diagram showing images output by an image output unit in the embodiment.

FIG. 12 is a diagram showing images output by the image output unit 2383 under a control of the output control unit 237B.

For example, under a control of the output control unit 237B, the image output unit 238B sequentially outputs frames of display images P31 to P34 to the projector 3A in a predetermined cycle, as shown in FIG. 12.

Herein, when an input operation is carried out with respect to the operating device 22 after the display image P32 has been output, a control image CA is generated by the control image generating unit 236A based on a control signal input in accordance with the input operation. The control image CA is output to the projector 3A in place of the display image P33 output at an output timing after the display image P32. Then, the display image P34 is output at an output timing subsequent to the control image CA. That is, in the embodiment, a control image is output to the projector at a timing corresponding to a timing at which a display image is output and in place of the display image.

As above, the document camera 2B, apart from outputting a control image at a timing at which a display image is output, outputs display image and control image frames to the projector 3A by passing through the same steps as steps S31 to S35 of the document camera 2A.

According to the display system 1B of the embodiment, apart from it being possible to achieve the same advantages as those of the display system 1A, it is possible to achieve the following advantages.

When the document camera 2B outputs a control image, it outputs the control image in place of one frame's worth of display image. According to this, it is not necessary to provide a period in which a control image frame is output while display image frames are being output. Consequently, it is possible to heighten an output frequency of display image frames. Meanwhile, when an output frequency of display image frames is high enough, it is possible, even when one display image frame is replaced with a control image frame, to make the absence of the one display image frame inconspicuous. Consequently, even when the document camera 2B images a dynamic body, it is possible to smoothly display the dynamic body by means of the projector 3A.

4. Fourth Embodiment

Next, a description will be given of a fourth embodiment of the invention.

A display system according to the embodiment includes the same configuration as that of the display system 1. Herein, with the display system 1, a configuration is such that the document camera 2 outputs a control image between display image frames. As opposed to this, with the display system according to the embodiment, a document camera outputs an image wherein a display image and a control image are set in one frame. The display system according to the embodiment and the display system 1 differ in this point. In the following description, portions identical and approximately identical to the already described portions will be given identical reference numerals and characters, and a description will be omitted.

Configuration of Display System

Figure 13:
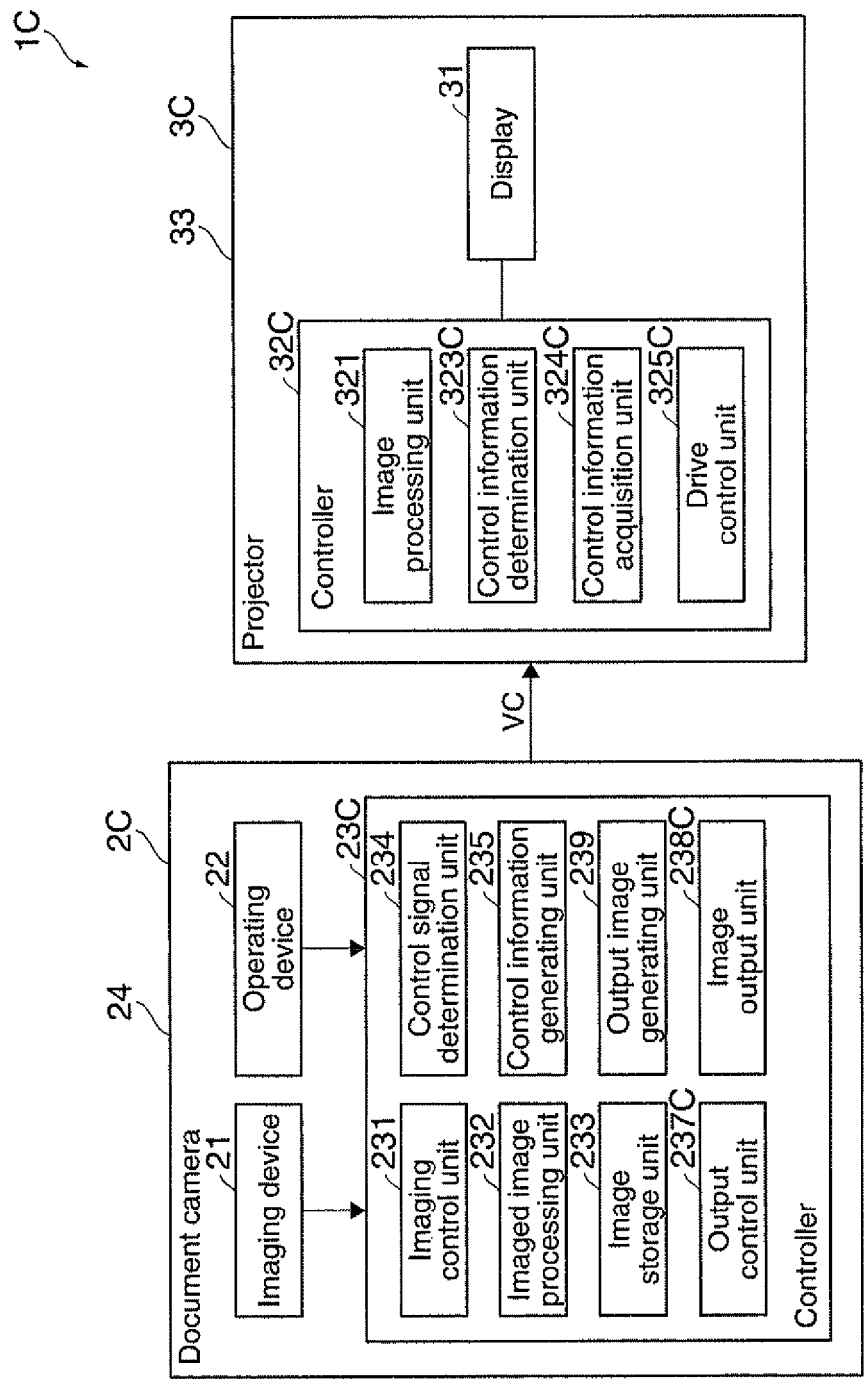
FIG. 13 is a block diagram showing a configuration of a display system according to a fourth embodiment of the invention.

FIG. 13 is a block diagram showing a configuration of a display system 1C according to the embodiment.

The display system 1C according to the embodiment includes a document camera 2C and a projector 3C, as shown in FIG. 13, and the projector 3C, while displaying display images input from the document camera 2C, executes a process corresponding to control information included in a control image input from the document camera 2C.

Configuration of Document Camera

The document camera 2C has the same configuration as that of the document camera 2 except that it has a controller 23C in place of the controller 23. Also, the controller 23C has the same configuration as that of the controller 23 except that it has an output image generating unit 239, an output control unit 237C, and an image output unit 238C in place of the control image generating unit 236, output control unit 237, and image output unit 238.

Figure 14:
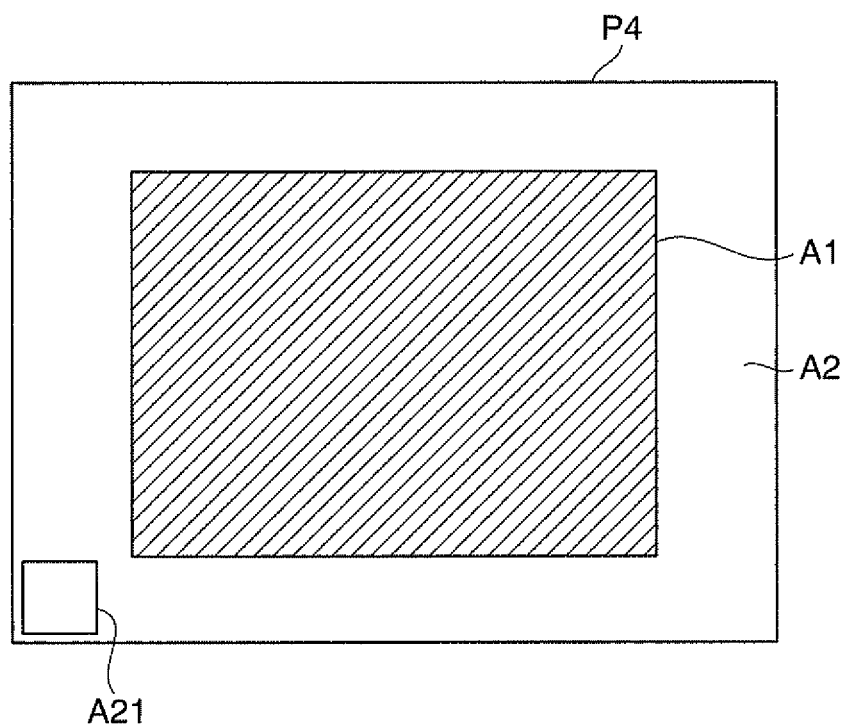
FIG. 14 is a diagram showing an output image in the embodiment.

FIG. 14 is a diagram showing an output image P4 generated by the output image generating unit 239.

The output image generating unit 239 generates an output image P4 wherein a display image, which is an imaged image processed by the imaged image processing unit 232 and stored in the image storage unit 233, and a two-dimensional code, which indicates control information corresponding to an input control signal, are set. The output image P4 has a display image setting region A1, in which the display image is set, and a non-display region A2, which is a region undisplayed by the projector 3C, as shown in FIG. 14. Of these regions, the non-display region A2 has a code setting region A21 in which is set a two-dimensional code which is an image wherein details of the control signal are encoded.

Specifically, when it is determined by the control signal determination unit 234 that no control signal has been input, the output image generating unit 239 generates an output image P4 wherein a display image (an imaged image) is set in the display image setting region A1, and nothing is set in the code setting region A21.

Meanwhile, when it is determined by the control signal determination unit 234 that a control signal has been input, the output image generating unit 239 generates an output image P4 wherein a display image (an imaged image) is set in the display image setting region A1 in the same way, and furthermore, a two-dimensional code generated by the control information generating unit 235 is set in the code setting region A21.

That is, the image in the non-display region A2 including the two-dimensional code set in the code setting region A21 corresponds to a control image of some aspects of the invention, and the display image which is the imaged image set in the display image setting region A1 corresponds to a display image of some aspects of the invention. Then, the output image generating unit 239 corresponds to a display image generating unit and control image generating unit of some aspects of the invention.

The output control unit 237C controls an output by the image output unit 238C of the output images P4 generated by the output image generating unit 239. Specifically, the output control unit 237C causes the image output unit 238C to output the output images P4 at predetermined timings (for example, a frequency of 24 Hz).

The image output unit 238C, under a control of the output control unit 237C, outputs the generated output images P4 to the projector 3C.

Figure 15:
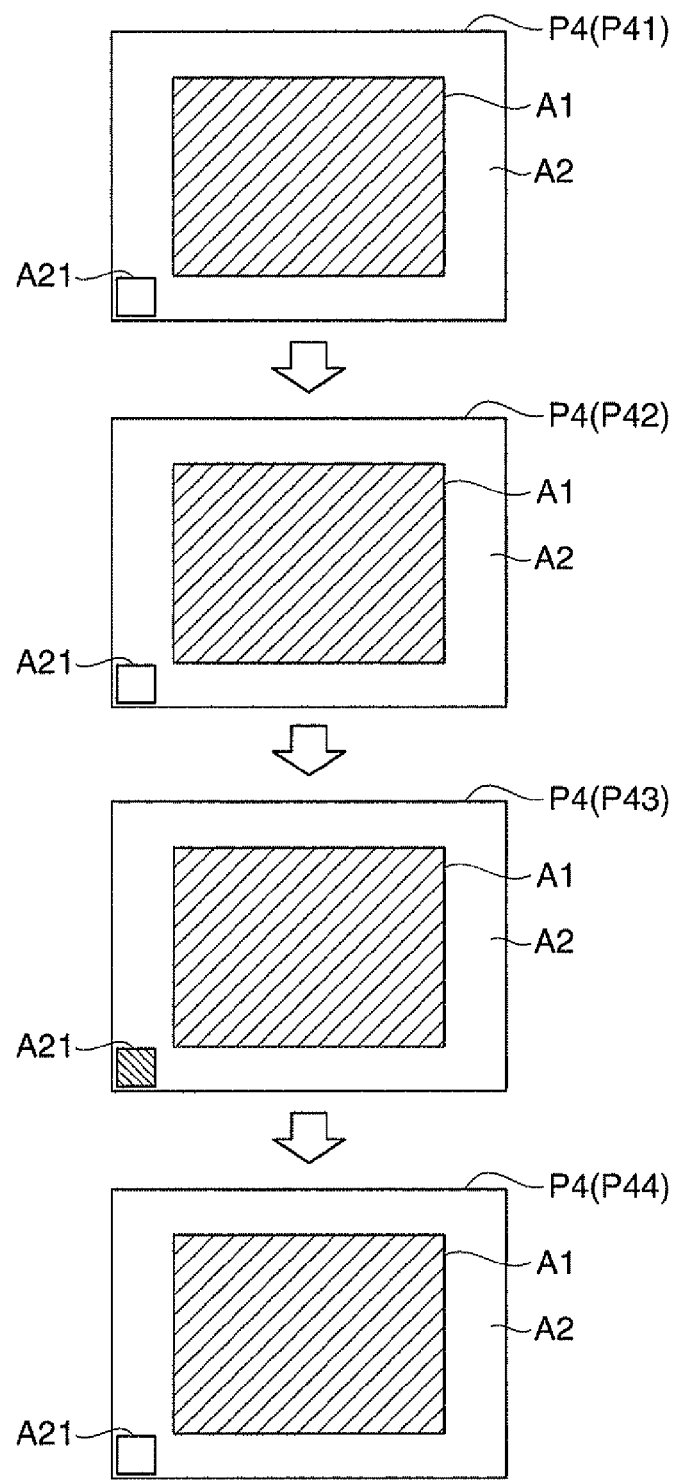
FIG. 15 is a diagram showing a transition of the output image in the embodiment.

FIG. 15 is a diagram showing a transition of the output images P4 (P41 to P44).

By means of the heretofore described configuration, the document camera 2C, as well as outputting a display image, which is an imaged image, with the display image included in the output image P4, outputs a two-dimensional code, which is control information generated at a timing at which the operating device 22 is operated, with the two-dimensional code included in the same output image P4.

Specifically, with the document camera 2C, as shown in FIG. 15, in a condition in which the operating device 22 is not operated, the output images P4 (P41 and P42) in which the two-dimensional code is not set are sequentially output to the projector 3C.

Herein, after the output of the output image P42, on an input operation with respect to the operating device 22 being carried out, and a control signal corresponding to the input operation being input into the controller 23C, the output image P4 (P43) wherein the two-dimensional code is set in the code setting region A21 is generated by the output image generating unit 239. The output image P43 is output to the projector 3C by the image output unit 238C at an image output timing after the output image P42.

Then, after the output of the output image P43, when no input operation is carried out with respect to the operating device 22, the output image P4 (P44) in which the two-dimensional code is not set is output by the image output unit 238C at an image output timing after the output image P43.

Configuration of Projector

Returning to FIG. 13, the projector 3C has the same configuration as that of the projector 3 except that it includes a controller 32C in place of the controller 32. The controller 32C, being configured as a circuit board controlling the whole of the projector 3C in the same way as the controller 32, has an image processing unit 321, a control information determination unit 323C, a control information acquisition unit 324C, and a drive control unit 325C.

Of these units, the control information determination unit 323C determines whether or not a two-dimensional code is set in the code setting region A21 of an image (the output image P4) input from the document camera 2C and processed by the image processing unit 321.

When it is determined by the control information determination unit 323C that a two-dimensional code is set, the control information acquisition unit 324C acquires the two-dimensional code. Then, the control information acquisition unit 324C analyzes the acquired two-dimensional code and acquires control information set in the two-dimensional code.

The drive control unit 325C acquires an image (a display image), among images (the output images P4) drawn by the image processing unit 321, set in a region corresponding to the display image setting region A1. Then, the drive control unit 325C outputs a drive signal corresponding to the acquired display image to the display 31, and causes the display 31 to display the display image. The drive control unit 325C may be arranged so as to hold information, which indicates a region corresponding to the display image setting region A1, in an input image, or acquire the information from the two-dimensional code.

Also, the drive control unit 325C, based on the control information acquired by the control information acquisition unit 324C, controls a drive of the projector 3C. For example, in the same way as the drive control unit 325, when control information generated in accordance with an input operation of the image quality adjustment key is acquired, the drive control unit 325C, based on the control information, causes the image processing unit 321 to execute an image quality adjustment process.

Process of Document Camera

Figure 16:
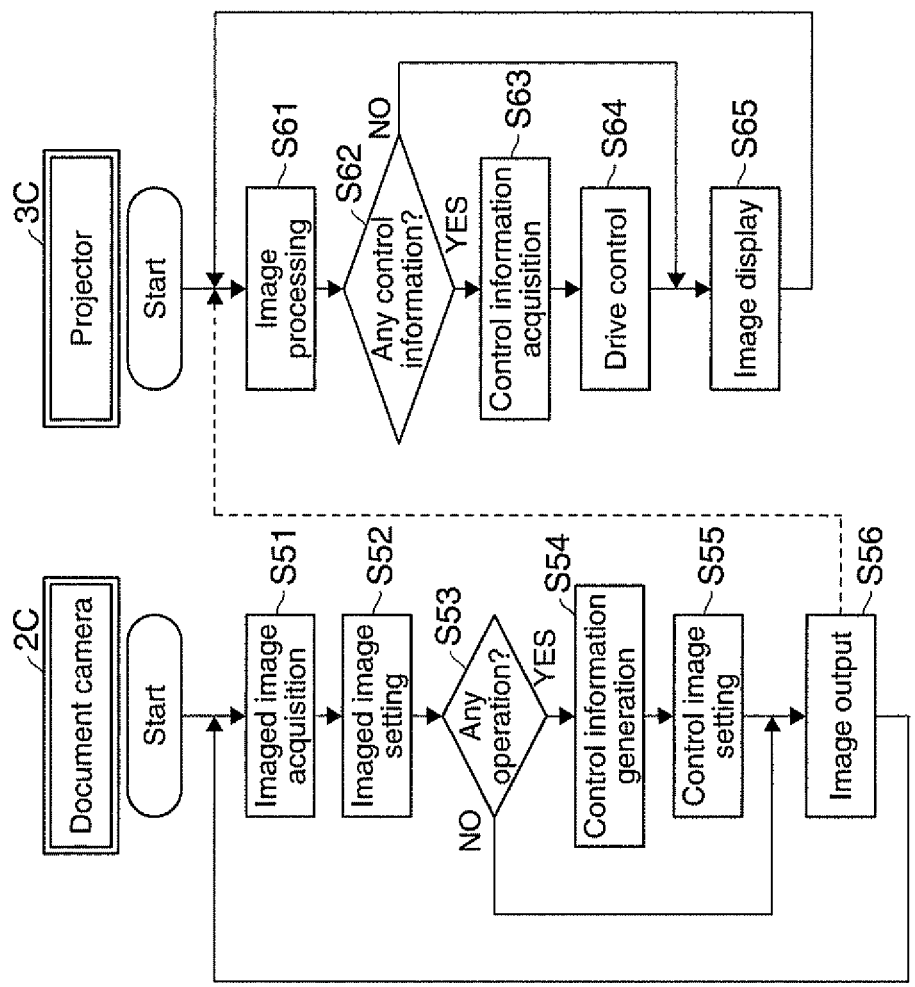
FIG. 16 is a flowchart showing control processes carried out by a document camera and a projector in the embodiment.

FIG. 16 is a flowchart showing control processes carried out by the document camera 2C and projector 3C.

Each of the document camera 2C and projector 3C reads a control program stored in an unshown memory, and executes the following control process by means of the heretofore described configuration.

In the control process, with the document camera 2C, as shown in FIG. 16, firstly, the imaged image processing unit 232 acquires an image imaged by the imaging device 21 under a control of the imaging control unit 231, and generates a display image (step S51).

Subsequently, the output image generating unit 239 sets the acquired imaged image as a display image in the display image setting region A1 of the output image P4 to be output to the projector 3C (step S52).

Subsequently, the control signal determination unit 234 determines whether or not a control signal has been input from the operating device 22 (step S53).

Herein, if it is determined by the control signal determination unit 234 that no control signal has been input, the controller 23C shifts the process to step S56. In the step S56, the image output unit 238C outputs the output image P4 generated in step S52, that is, the output image P4 wherein the imaged image is set in the display image setting region A1, and no two-dimensional code is set in the code setting region A21, to the projector 3C (step S56). Subsequently, the controller 23C returns the process to step S51.

Meanwhile, if it is determined by the control signal determination unit 234 that a control signal has been input, the control information generating unit 235 generates a two-dimensional code as control information based on details of the control signal (step S54).

Then, the output image generating unit 239 sets the two-dimensional code generated in step S54 in the code setting region A21 of the output image P4 in which the imaged image has been set in step S52 (step S55).

Next, under a control of the output control unit 237C, the image output unit 238C outputs the output image P4, in which the two-dimensional code has been set in step S55, to the projector 3C (step S56). Subsequently, the controller 23C returns the process to step S51.

The above steps S51 to S56 are repeatedly executed by the document camera 2C.

Process of Projector

Meanwhile, with the projector 3C, firstly, the image processing unit 321 processes an image signal input from the document camera 2C via the image signal input unit 3332, and draws an image corresponding to the image signal in an unshown frame memory (step S61).

Next, the control information determination unit 323C determines whether or not a two-dimensional code is set in the drawn image (step S62).

Herein, if it is determined by the control information determination unit 323C that no two-dimensional code is set, the controller 32C shifts the process to step S65.

Meanwhile, if it is determined by the control information determination unit 323C that a two-dimensional code is set, the control information acquisition unit 324C acquires and analyzes the two-dimensional code, and acquires control information indicated by the two-dimensional code (step S63). Then, the drive control unit 3250 executes a process corresponding to the acquired control information (step S64).

Subsequently, the drive control unit 3250 acquires an image, among images drawn in the frame memory, in a region corresponding to the display image setting region A1, and outputs a drive signal corresponding to the image to the display 31 (step S65). Because of this, the image (a display image) is displayed by the display 31.

The above steps S61 to S65 are repeatedly executed by the projector 30.

According to the display system 10 of the embodiment, apart from it being possible to achieve the same advantages as those of the display system 1, it is possible to achieve the following advantages.

The document camera 2C outputs the output image P4 in which a display image to be displayed by the projector 30 and a two-dimensional code for controlling the projector 30 are set. According to this, in comparison with the case of outputting a control image between display image frames as in the display systems 1 and 1A, it is possible to reduce the rate of frames input into the projector 3C (frame rate), and contrarily, it is also possible to increase the frame rate of display images input into the projector 3C from the document camera 2C. Also, in comparison with the case of replacing a display image with a control image as in the display system 1B, it is possible to more reliably input display images into the projector 3C. Consequently, as well as it being possible to control the projector 3C by means of the document camera 2C, it is possible to more appropriately display generated display images by means of the projector 3C.

5. Embodiment Modifications

The invention not being limited to the heretofore described embodiments, modifications, improvements, and the like, in a range in which it is possible to achieve the advantage of some aspects of the invention are included in the invention.

In the first embodiment, a configuration is such that inset images including a dummy image and a control image are inset between display image frames, but the invention is not limited to this. That is, inset images may be inset between the frames in a predetermined cycle. For example, a configuration may be such that one inset image frame is output immediately after ten display image frames have been output.

In each heretofore described embodiment, a configuration is such that the control information generating unit 235 generates a two-dimensional code wherein control information based on a control signal input from the operating device 22 is encoded, but the invention is not limited to this. Control information may be of any form, provided that it is of a form in which it can be extracted and analyzed by the projectors 3, 3A, and 3C. For example, the control information may be a one-dimensional code, and furthermore, another code may be used. Also, a configuration may be such that control information is generated as a string of characters, and a control image and output image including the string of characters are generated and output, provided that the projectors 3, 3A, and 3C are configured so as to be able to recognize the string of characters. Furthermore, a plurality of images wherein control information such as a two-dimensional code is encoded may be set in one image (a control image and an output image). In addition, the size of a two-dimensional code may be set as appropriate, and the type of the two-dimensional code can also be set as appropriate.

In each heretofore described embodiment, a configuration is such that a generation and output of a control image are carried out every time a control signal is input from the operating device 22, but the invention is not limited to this. For example, when the keys disposed on the operating device 22 are continuously input operated, a configuration is such that, based on an input operation quantity and input operation time period using the keys, a number of control images, equivalent to a number obtained by subtracting or dividing the input operation quantity at a predetermined rate, are output.

In the first embodiment, a configuration is such that the cycle determination unit 322, based on the image input cycle, determines whether or not an input image is a display image, but the invention is not limited to this. For example, an image determination unit which counts an input-image frame quantity and, based on the frame quantity, determines whether or not the input image is a display image may be employed in place of the cycle determination unit 322. In this case, for example, a configuration may be such that the image determination unit determines, depending on whether the frame quantity is an odd number or an even number, whether the input image is a display image, or is a control image or a dummy image.

In the first embodiment, no predetermined pattern such as the pattern PT is set in inset images which, being generated by the control image generating unit 236, are configured of a dummy image and a control image, but the invention is not limited to this. That is, a configuration may be such that a predetermined pattern is set in the inset image, thus clearly distinguishing an inset image from a display image.

In the second and third embodiments, a configuration is such that a control image has the star-shaped pattern PT for distinguishing it from a display image, but the invention is not limited to this. That is, the shape of the pattern PT may be set as appropriate. Also, the pattern not being limited to a specified pattern, or the like, a control image may be generated by generating an image wherein the average luminance level of a display image is increased or decreased by an amount equivalent to a predetermined value, and including control information in the image. In this case, it is sufficient that the projector calculates an average luminance level of input images for each input frame and, based on the average luminance level, determines whether the input image is a display image or a control image.

In the fourth embodiment, in the output image P4, the display image setting region A1 is set in the center of the image P4, and the code setting region A21 of the non-display region A2 is set at the lower left of the image P4, but the invention is not limited to this. That is, the positions thereof are not questioned, provided that the projector can distinguish between a display image and control information such as a two-dimensional code.

In each heretofore described embodiment, the document cameras 2 and 2A to 2C, and the projectors 3, 3A, and 3C, are cited as an image output apparatus and an image display apparatus respectively, but the invention is not limited to these. That is, the invention can also be applied to a display system employing another image output apparatus and another image display apparatus. For example, as an image output apparatus, it is possible to cite a reproduction apparatus, which reproduces from a disk type recording medium such as a DVD and outputs an image signal, and a personal computer (PC) while, as an image display apparatus, it is possible to cite any kind of display.

In each heretofore described embodiment, a configuration is such that the control programs which cause the document cameras 2 and 2A to 2C to execute the control processes, and the control programs which cause the projectors 3, 3A, and 3C to execute the control processes, are stored in a memory, but the invention is not limited to this. For example, a configuration may be such that each of the control programs is stored in a disk type recording medium such as a CD or a DVD, a magnetic disk device, or the like, and a controller, when executing the control process, retrieves the control program as appropriate.

The invention can be utilized suitably in a display system including an image output apparatus and an image display apparatus.

What is claimed is:

1. A display system comprising:
an image output apparatus and an image display apparatus, wherein
the image output apparatus has:
a display image generating unit which generates a display image which is an image which the image display apparatus is caused to display;
a control image generating unit which generates a control image which is an image including control information for controlling the image display apparatus; and
an image output unit which outputs the display image and the control image to the image display apparatus, and
the image display apparatus has:
a display unit which receives at least one received image, wherein the display unit:
displays the received image if the received image is a display image, and
does not display the received image if the received image is a control image;
a control information acquisition unit which acquires the control information included in the control image; and
a drive control unit which, based on the acquired control information, controls a drive of the image display apparatus.

2. The display system according to claim 1, wherein
the display image generating unit generates the display image at a predetermined timing, and
the image output unit, based on the predetermined timing, outputs the control image.

3. The display system according to claim 1, wherein
the image output apparatus has:
an operating unit which outputs a control signal which controls the image display apparatus in accordance with an input operation;
a control signal determination unit which determines whether or not the control signal has been input; and
a control information generating unit which, when it is determined that the control signal has been input, generates the control information corresponding to the control signal, wherein
the control image generating unit, when it is determined by the control signal determination unit that the control signal has been input, generates the control image including the control information.

4. The display system according to claim 3, wherein
the control image generating unit, when it is determined by the control signal determination unit that the control signal has not been input, generates a dummy image not including the control information, and
the image output unit, when it is determined by the control signal determination unit that the control signal has been input, outputs the control image at a timing differing from the timing at which the display image is output, and when it is determined that the control signal has not been input, outputs the dummy image at a timing differing from the timing at which the display image is output.

5. The display system according to claim 3, wherein
the control image generating unit generates the control image including a predetermined pattern and the control information, and
the image display apparatus has an image determination unit which determines that the image is the control image when the predetermined pattern is included in an input image, and determines that the image is the display image when the predetermined pattern is not included.

6. The display system according to claim 1, wherein
the display image generating unit generates display images, and the control image is an image inserted between frames of the display images.

7. The display system according to claim 6, wherein the control image generating unit generates at least one dummy image, and inserts the dummy image between frames of the display images when the control signal has not been input.

8. The display system according to claim 1, wherein the display image generating unit generates a plurality of display images for the image display apparatus to successively display, and the control image generating unit generates the control image when the control signal is input, and generates a dummy image when the control signal is not input, and inserts the control image and the dummy image between frames of the display images,
the image display apparatus has:
a cycle determination unit that determines whether or not an input cycle of images from the image output apparatus corresponds to a cycle in which the display images are input; and
a control information determination unit that determines whether or not the images include control information.

9. A display system comprising:
an image output apparatus which outputs an image and comprises:
a display image generating unit which generates a display image which is an image which an image display apparatus is caused to display;
a control image generating unit which generates a control image which is an image including control information for controlling the image display apparatus, the control image being configured so as not to be displayed by the image display apparatus; and
an image output unit which outputs the display image and control image to the image display apparatus; and
the image display apparatus has:
a display unit which receives at least one received image, wherein the display unit: displays the received image if the received image is the display image, and does not display the received image if the received image is the control image.

10. The display system according to claim 9, wherein
the display image generating unit generates display images, and the control image is an image inserted between frames of the display images.

11. The display system according to claim 10, wherein the control image generating unit generates at least one dummy image, and inserts the dummy image between frames of the display images when a control signal has not been input.

12. A control method whereby an image display apparatus connected to an image output apparatus is controlled by the image output apparatus, comprising:
generating a display image which is an image which the image display apparatus is caused to display;
generating a control image which is an image including control information for controlling the image display apparatus, the control image being configured so as not to be displayed by the image display apparatus;
outputting the display image and the control image to the image display apparatus;
receiving at least one received image at a display unit of the image display apparatus; and
controlling the display unit to display the received image if the received image is the display image and not to display the received image if the received image is the control image.

13. The control method according to claim 12, wherein
generating the display image comprises generating display images, further comprising inserting the control image between frames of the display images.

14. The control method according to claim 13, further comprising generating at least one dummy image, and inserting the dummy image between frames of the display images when a control signal has not been input.

15. A non-transitory recording medium on which a control program which controls an image display apparatus connected to an image output apparatus is recorded so as to be readable by the image output apparatus, wherein
the control program recorded causes the image output apparatus to execute:
a display image generating step which generates a display image which is an image which the image display apparatus is caused to display;
a control image generating step which generates a control image which is an image including control information for controlling the image display apparatus, the control image being configured so as not to be displayed by the image display apparatus; and
an image output step which outputs the display image and control image to the image display apparatus; and
the control program recorded causes the image display apparatus to execute:
image receiving step which receives at least one received image at a display unit of the image display apparatus; and
display controlling step which controls the display unit to display the received image if the received image is the display image and not to display the received image if the received image is the control image.

16. A non-transitory recording medium according to claim 15, wherein the display image generating step further generates a plurality of display images, further comprising a step of inserting the control image between frames of the display images.

17. A non-transitory recording medium according to claim 16, further comprising a step of generating at least one dummy image, and inserting the dummy image between frames of the display images when the control signal has not been input.

18. A control method which controls an image display apparatus which displays a display image, comprising:
determining whether or not control information for controlling the image display apparatus is included in an input image received by the image display apparatus;
displaying the input image when it is determined that the control information is not included;
acquiring the control information included in the input image when it is determined that the control information is included when the input image is a control image;
controlling a drive of the image display apparatus based on the acquired control information; and
controlling the image display apparatus to display the input image if the input image is the display image and not to display the input image if the input image is the control image.

* * * * *